(12) United States Patent
Matsumura et al.

(10) Patent No.: US 11,955,641 B2
(45) Date of Patent: Apr. 9, 2024

(54) BINDER COMPOSITION FOR NON-AQUEOUS SECONDARY BATTERY AND METHOD OF PRODUCING SAME, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Taku Matsumura, Tokyo (JP); Ai Masuda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 26 days.

(21) Appl. No.: 17/635,924

(22) PCT Filed: Aug. 21, 2020

(86) PCT No.: PCT/JP2020/031740
§ 371 (c)(1),
(2) Date: Feb. 16, 2022

(87) PCT Pub. No.: WO2021/039674
PCT Pub. Date: Mar. 4, 2021

(65) Prior Publication Data
US 2022/0336812 A1    Oct. 20, 2022

(30) Foreign Application Priority Data

Aug. 30, 2019  (JP) ................................. 2019-159010

(51) Int. Cl.
*H01M 4/62* (2006.01)
*C08F 297/04* (2006.01)
(Continued)

(52) U.S. Cl.
CPC .......... *H01M 4/622* (2013.01); *C08F 297/044* (2013.01); *C08F 297/048* (2013.01);
(Continued)

(58) Field of Classification Search
CPC .. H01M 4/622; H01M 4/0416; H01M 4/1393; H01M 4/587; H01M 10/0525;
(Continued)

(56) References Cited

U.S. PATENT DOCUMENTS

| 11,482,707 B2 | 10/2022 | Yamamoto et al. |
| 2016/0285100 A1 | 9/2016 | Tanizaki et al. |

(Continued)

FOREIGN PATENT DOCUMENTS

| CN | 105765775 A | 7/2016 |
| JP | 2012204303 A | 10/2012 |

(Continued)

OTHER PUBLICATIONS

Mar. 1, 2022, International Preliminary Report on Patentability issued in the International Patent Application No. PCT/JP2020/031740.

(Continued)

*Primary Examiner* — Andrew J. Oyer
(74) *Attorney, Agent, or Firm* — KENJA IP LAW PC

(57) ABSTRACT

A binder composition for a non-aqueous secondary battery contains water-soluble macromolecules, water, and a particulate polymer formed of a polymer that includes a block region formed of an aromatic vinyl monomer unit. Surface acid content A of the particulate polymer is 0.05 mmol/g or more, acid content B in an aqueous phase of the binder composition per 1 g of the particulate polymer is not less than 0.03 mmol/g and not more than 0.80 mmol/g, and a ratio (A/B) of the surface acid content A of the particulate polymer and the acid content B in the aqueous phase of the (Continued)

binder composition is not less than 0.5 and not more than 5.0.

13 Claims, 1 Drawing Sheet

(51) Int. Cl.
    *H01M 4/04*         (2006.01)
    *H01M 4/1393*     (2010.01)
    *H01M 4/587*      (2010.01)
    *H01M 10/0525*    (2010.01)

(52) U.S. Cl.
    CPC ....... *H01M 4/0416* (2013.01); *H01M 4/1393* (2013.01); *H01M 4/587* (2013.01); *H01M 10/0525* (2013.01)

(58) Field of Classification Search
    CPC ........ H01M 4/139; H01M 10/05; H01M 4/32; C08F 297/044; C08F 297/048; C08F 287/00; C08F 279/04; C08F 297/04; C08K 3/04; C08L 53/005; C08L 53/02; C08L 101/14; Y02E 60/10
    See application file for complete search history.

(56) References Cited

U.S. PATENT DOCUMENTS

| | | | |
|---|---|---|---|
| 2020/0020928 A1 | 1/2020 | Maeda et al. | |
| 2020/0347172 A1* | 11/2020 | Yamamoto | C08L 9/06 |
| 2020/0411870 A1 | 12/2020 | Adachi | |
| 2021/0111408 A1 | 4/2021 | Yusaku et al. | |

FOREIGN PATENT DOCUMENTS

| | | | |
|---|---|---|---|
| JP | 2013182765 A | 9/2013 | |
| JP | 2015070245 A | 4/2015 | |
| JP | 2016184521 A | 10/2016 | |
| WO | 2015033827 A1 | 3/2015 | |
| WO | 2015098507 A1 | 7/2015 | |
| WO | 2018163295 A1 | 9/2018 | |
| WO | 2019087827 A1 | 5/2019 | |
| WO | 2019107209 A1 | 6/2019 | |
| WO | 2019107229 A1 | 6/2019 | |
| WO | 2019188722 A1 | 10/2019 | |

OTHER PUBLICATIONS

Nov. 10, 2020, International Search Report issued in the International Patent Application No. PCT/JP2020/031740.

Aug. 3, 2023, the Extended European Search Report issued by the European Patent Office in the corresponding European Patent Application No. 20858767.5.

* cited by examiner

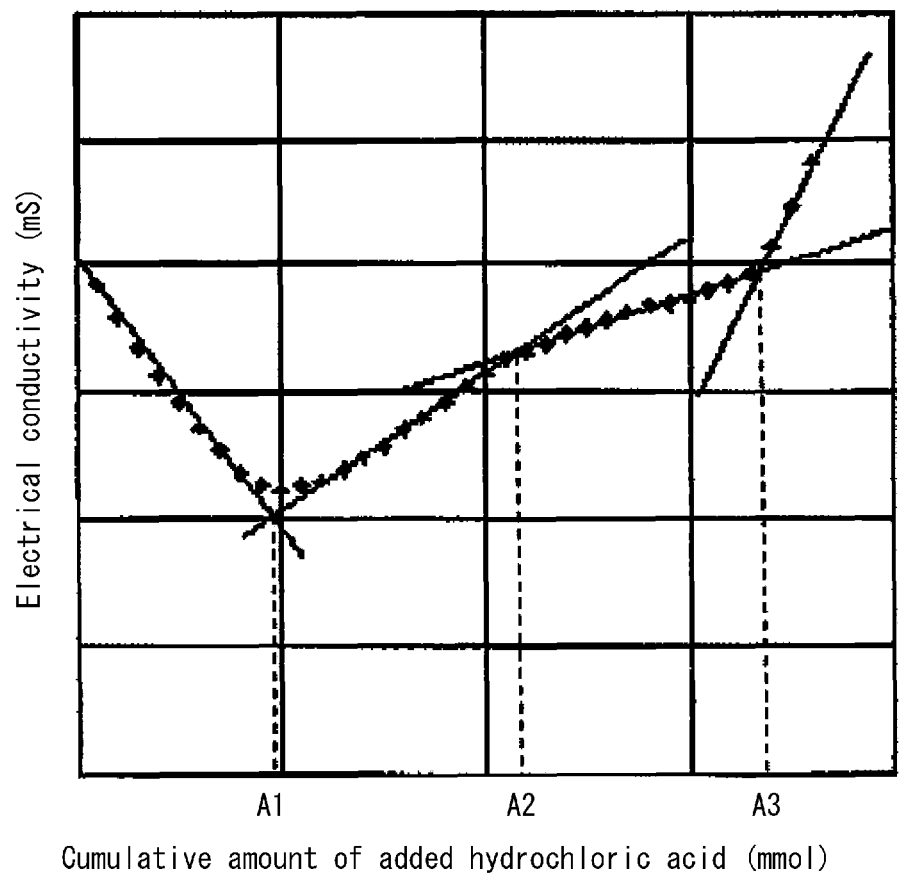

BINDER COMPOSITION FOR NON-AQUEOUS SECONDARY BATTERY AND METHOD OF PRODUCING SAME, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery and method of producing the same, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. Consequently, in recent years, studies have been made to improve battery members such as electrodes for the purpose of achieving even higher non-aqueous secondary battery performance.

An electrode used in a secondary battery such as a lithium ion secondary battery normally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

There have previously been instances in which a particulate polymer formed of a polymer that includes a block region formed of an aromatic vinyl monomer unit has been used as a binder contained in a binder composition.

As one example, Patent Literature (PTL) 1 discloses a binder composition containing a particulate polymer formed of a polymer that includes a block region formed of an aromatic vinyl monomer unit and that has a tetrahydrofuran-insoluble content of not less than 5 mass % and not more than 40 mass %. According to PTL 1, the stability of a slurry composition can be improved through the further inclusion of a water-soluble polymer that includes a hydrophilic group and has a weight-average molecular weight of not less than 15,000 and not more than 500,000 in this binder composition.

CITATION LIST

Patent Literature

PTL 1: WO2019/107209A1

SUMMARY

Technical Problem

An electrode including an electrode mixed material layer may be stored in a high-humidity environment. Therefore, it is desirable for an electrode including an electrode mixed material layer to maintain peel strength well even after storage in a high-humidity environment (i.e., have excellent moisture resistance).

However, there is room for improving the moisture resistance of an electrode including an electrode mixed material layer that is formed using the conventional binder composition described above.

There is also room for improving a slurry composition in which the conventional binder composition described above is used in terms of improving the viscosity stability of the slurry composition.

Accordingly, one object of the present disclosure is to provide a binder composition for a non-aqueous secondary battery with which it is possible to form a slurry composition for a non-aqueous secondary battery electrode having excellent viscosity stability and an electrode for a non-aqueous secondary battery having excellent moisture resistance.

Another object of the present disclosure is to provide a slurry composition for a non-aqueous secondary battery electrode that has excellent viscosity stability and with which it is possible to form an electrode for a non-aqueous secondary battery having excellent moisture resistance.

Yet another object of the present disclosure is to provide an electrode for a non-aqueous secondary battery that has excellent moisture resistance and a non-aqueous secondary battery that includes this electrode for a non-aqueous secondary battery.

Solution to Problem

The inventors conducted diligent investigation with the aim of solving the problems set forth above. The inventors discovered that a slurry composition for a non-aqueous secondary battery electrode having excellent viscosity stability and an electrode for a non-aqueous secondary battery having excellent moisture resistance are obtained by using a binder composition containing: a particulate polymer that is formed of a polymer including a block region formed of an aromatic vinyl monomer unit and that has a surface acid content of not less than a specific value; water-soluble macromolecules; and water, and in which acid content in the aqueous phase and a ratio of the surface acid content of the particulate polymer and the acid content in the aqueous phase are within specific ranges. In this manner, the inventors completed the present disclosure.

Specifically, the present disclosure aims to advantageously solve the problems set forth above, and a presently disclosed binder composition for a non-aqueous secondary battery comprises: a particulate polymer formed of a polymer that includes a block region formed of an aromatic vinyl monomer unit; water-soluble macromolecules; and water, wherein surface acid content A of the particulate polymer is 0.05 mmol/g or more, acid content B in an aqueous phase of the binder composition per 1 g of the particulate polymer is not less than 0.03 mmol/g and not more than 0.80 mmol/g, and a ratio A/B of the surface acid content A of the particulate polymer and the acid content B in the aqueous phase of the binder composition is not less than 0.5 and not more than 5.0. By using an aqueous binder composition that contains water-soluble macromolecules and a particulate polymer that is formed of a polymer including a block region formed of an aromatic vinyl monomer unit and that has a surface acid content A of not less than a specific value, and in which the acid content B in the aqueous phase and a ratio (A/B) of the surface acid content A of the particulate polymer and the acid content B in the aqueous phase are within specific ranges in this manner, it is possible to obtain a slurry composition for a non-aqueous secondary battery electrode having excellent viscosity stability and an electrode for a non-aqueous secondary battery having excellent moisture resistance.

Note that a "monomer unit" of a polymer referred to in the present disclosure is a "repeating unit derived from the monomer that is included in a polymer obtained using the monomer". Also note that the "proportional content (mass %)" of each repeating unit in a polymer referred to in the present disclosure can be measured using a nuclear magnetic resonance (NMR) method such as $^1$H-NMR.

Moreover, when a polymer is said to "include a block region formed of a monomer unit" in the present disclosure, this means that "a section where only such monomer units are bonded in a row as repeating units is present in the polymer".

Also, the "surface acid content A" of a particulate polymer referred to in the present disclosure indicates the surface acid content per 1 g of solid content of the particulate polymer and can be measured by a measurement method described in the EXAMPLES section of the present specification.

Moreover, the "aqueous phase of the binder composition" referred to in the present disclosure indicates a portion of the binder composition excluding the particulate polymer, and the "acid content B in an aqueous phase of the binder composition per 1 g of the particulate polymer" can be measured by a method described in the EXAMPLES section of the present specification.

In the presently disclosed binder composition for a non-aqueous secondary battery, the polymer preferably further includes either or both of an aliphatic conjugated diene monomer unit and an alkylene structural unit. When the polymer further includes either or both of an aliphatic conjugated diene monomer unit and an alkylene structural unit in this manner, the peel strength of an electrode formed using the binder composition can be improved.

In the presently disclosed binder composition for a non-aqueous secondary battery, a mass ratio of aromatic vinyl monomer units and a total of aliphatic conjugated diene monomer units and alkylene structural units in the polymer, in terms of aromatic vinyl monomer units/total of aliphatic conjugated diene monomer units and alkylene structural units, is preferably not less than 15/85 and not more than 50/50. When the mass ratio of aromatic vinyl monomer units and the total of aliphatic conjugated diene monomer units and alkylene structural units in the polymer is within the specific range set forth above in this manner, the peel strength of an electrode formed using the binder composition can be further improved.

Note that the mass ratio of aromatic vinyl monomer units and the total of aliphatic conjugated diene monomer units and alkylene structural units in a polymer can be measured by a method described in the EXAMPLES section of the present specification.

In the presently disclosed binder composition for a non-aqueous secondary battery, the aliphatic conjugated diene monomer unit is preferably a 1,3-butadiene unit, and the alkylene structural unit is preferably a hydrogenated 1,3-butadiene unit. When the aliphatic conjugated diene monomer unit is a 1,3-butadiene unit and the alkylene structural unit is a hydrogenated 1,3-butadiene unit in this manner, the peel strength and moisture resistance of an electrode formed using the binder composition can be improved because thermal stability of the particulate polymer increases and degradation tends not to occur even when an electrode mixed material layer is heated during drying in electrode production.

In the presently disclosed binder composition for a non-aqueous secondary battery, the aromatic vinyl monomer unit is preferably a styrene unit. When the aromatic vinyl monomer unit is a styrene unit in this manner, the peel strength and moisture resistance of an electrode formed using the binder composition can be improved because thermal stability of the particulate polymer increases and degradation tends not to occur even when an electrode mixed material layer is heated during drying in electrode production.

In the presently disclosed binder composition for a non-aqueous secondary battery, the polymer preferably includes a graft portion that includes an acidic group-containing monomer unit. When the polymer includes a graft portion that includes an acidic group-containing monomer unit in this manner, the viscosity stability of a slurry composition produced using the binder composition can be further increased.

In the presently disclosed binder composition for a non-aqueous secondary battery, the surface acid content A of the particulate polymer is preferably 1.00 mmol/g or less. When the surface acid content A of the particulate polymer is 1.00 mmol/g or less in this manner, the peel strength of an electrode formed using the binder composition can be improved, and the internal resistance of a secondary battery can be reduced.

In the presently disclosed binder composition for a non-aqueous secondary battery, the particulate polymer preferably has a volume-average particle diameter of not less than 0.1 μm and less than 0.9 μm. When the volume-average particle diameter of the particulate polymer is within the specific range set forth above in this manner, the peel strength of an electrode formed using the binder composition can be improved, and the internal resistance of a secondary battery can be reduced.

Note that the volume-average particle diameter of a particulate polymer can be measured by a method described in the EXAMPLES section of the present specification.

In the presently disclosed binder composition for a non-aqueous secondary battery, the water-soluble macromolecules preferably include an acidic group. When the water-soluble macromolecules include an acidic group in this manner, the viscosity stability of a slurry composition produced using the binder composition can be further increased.

Moreover, the present disclosure aims to advantageously solve the problems set forth above, and a presently disclosed method of producing a binder composition for a non-aqueous secondary battery is a method of producing any one of the binder compositions for a non-aqueous secondary battery set forth above, comprising a purification step of removing a portion of the water-soluble macromolecules from a mixture that contains the particulate polymer, the water-soluble macromolecules, and water. By removing a portion of the water-soluble macromolecules from a mixture that contains the particulate polymer, the water-soluble macromolecules, and water in this manner, a binder composition in which the acid content in the aqueous phase and a ratio of the surface acid content of the particulate polymer and the acid content in the aqueous phase are within specific ranges can easily be produced. Consequently, it is easy to obtain a binder composition for a non-aqueous secondary battery with which it is possible to form a slurry composition for a non-aqueous secondary battery electrode having excellent viscosity stability and an electrode for a non-aqueous secondary battery having excellent moisture resistance.

Furthermore, the present disclosure aims to advantageously solve the problems set forth above, and a presently disclosed slurry composition for a non-aqueous secondary battery electrode comprises: an electrode active material; and any one of the binder compositions for a non-aqueous secondary battery set forth above. A slurry composition for a non-aqueous secondary battery electrode that contains an electrode active material and any one of the binder compositions for a non-aqueous secondary battery set forth above in this manner has excellent viscosity stability and can form an electrode having excellent moisture resistance.

Also, the present disclosure aims to advantageously solve the problems set forth above, and a presently disclosed electrode for a non-aqueous secondary battery comprises an electrode mixed material layer formed using the slurry composition for a non-aqueous secondary battery electrode set forth above. An electrode for a non-aqueous secondary battery that includes an electrode mixed material layer formed using the slurry composition for a non-aqueous secondary battery electrode set forth above in this manner has excellent moisture resistance.

Moreover, the present disclosure aims to advantageously solve the problems set forth above, and a presently disclosed non-aqueous secondary battery comprises the electrode for a non-aqueous secondary battery set forth above. By using the electrode for a non-aqueous secondary battery set forth above, it is possible to obtain a non-aqueous secondary battery that can display excellent performance.

Advantageous Effect

According to the present disclosure, it is possible to provide a binder composition for a non-aqueous secondary battery with which it is possible to form a slurry composition for a non-aqueous secondary battery electrode having excellent viscosity stability and an electrode for a non-aqueous secondary battery having excellent moisture resistance.

Moreover, according to the present disclosure, it is possible to provide a slurry composition for a non-aqueous secondary battery electrode that has excellent viscosity stability and with which it is possible to form an electrode for a non-aqueous secondary battery having excellent moisture resistance.

Furthermore, according to the present disclosure, it is possible to provide an electrode for a non-aqueous secondary battery that has excellent moisture resistance and a non-aqueous secondary battery that includes this electrode for a non-aqueous secondary battery.

BRIEF DESCRIPTION OF THE DRAWING

In the accompanying drawing,
FIG. 1 is a graph in which electrical conductivity is plotted against cumulative amount of added hydrochloric acid when calculating the surface acid content of a particulate polymer and the acid content in an aqueous phase of a binder composition.

DETAILED DESCRIPTION

The following provides a detailed description of embodiments of the present disclosure.

The presently disclosed binder composition for a non-aqueous secondary battery is a composition that is for use in production of a non-aqueous secondary battery and, in particular, can suitably be used in production of an electrode of a non-aqueous secondary battery. For example, the presently disclosed binder composition for a non-aqueous secondary battery can be used to produce the presently disclosed slurry composition for a non-aqueous secondary battery electrode. Moreover, a slurry composition that is produced using the presently disclosed binder composition can be used in production of an electrode of a non-aqueous secondary battery such as a lithium ion secondary battery. Furthermore, a feature of the presently disclosed non-aqueous secondary battery is that the presently disclosed electrode for a non-aqueous secondary battery formed using the presently disclosed slurry composition is used therein.

Note that the presently disclosed binder composition for a non-aqueous secondary battery, slurry composition for a non-aqueous secondary battery electrode, and electrode for a non-aqueous secondary battery are preferably for a negative electrode, and the presently disclosed non-aqueous secondary battery is preferably a non-aqueous secondary battery in which the presently disclosed electrode for a non-aqueous secondary battery is used as a negative electrode.

(Binder Composition for Non-Aqueous Secondary Battery)

The presently disclosed binder composition contains a particulate polymer, water-soluble macromolecules, and water, and optionally further contains other components that can be compounded in binder compositions.

The presently disclosed binder composition makes it possible to produce a slurry composition for a non-aqueous secondary battery electrode having excellent viscosity stability and to form an electrode for a non-aqueous secondary battery having excellent moisture resistance as a result of containing a particulate polymer that is formed of a polymer including a block region formed of an aromatic vinyl monomer unit and that has a surface acid content A of 0.05 mmol/g or more, as a result of the acid content B in the aqueous phase being not less than 0.03 mmol/g and not more than 0.80 mmol/g, and as a result of a ratio (A/B) of the surface acid content A of the particulate polymer and the acid content B in the aqueous phase being not less than 0.5 and not more than 5.0.

Although it is not clear why a slurry composition having excellent viscosity stability and an electrode having excellent moisture resistance are obtained by, with respect to a binder composition containing a particulate polymer that is formed of a polymer including a block region formed of an aromatic vinyl monomer unit, setting the surface acid content A of the particulate polymer as 0.05 mmol/g or more while also using water-soluble macromolecules in combination therewith, setting the acid content in the aqueous phase as not less than 0.03 mmol/g and not more than 0.80 mmol/g, and setting a ratio (A/B) of the surface acid content A of the particulate polymer and the acid content B in the aqueous phase as not less than 0.5 and not more than 5.0, the reason for this is presumed to be as follows.

Firstly, the particulate polymer contained in the presently disclosed binder composition displays high dispersing ability in water as a result of having a surface acid content A that is not less than a specific value. The acid content B in the aqueous phase is thought to mainly originate from the water-soluble macromolecules, and thus the water-soluble macromolecules can cause even better dispersion of the particulate polymer in water when the acid content B in the aqueous phase is not less than a specific amount. For this reason, slurry composition aggregation is inhibited and a slurry composition having excellent viscosity stability can be obtained when using the presently disclosed binder composition.

Conversely, when the acid content B in the aqueous phase described above becomes excessive, an electrode mixed material layer that is obtained through drying of a slurry composition containing the binder composition may absorb moisture, and electrode peel strength may decrease. However, by setting the acid content B in the aqueous phase of the presently disclosed binder composition as not more than a specific value, excessive absorption of moisture does not occur even when an electrode mixed material layer is stored in a high-humidity environment, and the peel strength of an electrode can be maintained well.

In addition, the effects of improving viscosity stability and improving moisture resistance described above can be achieved in a good balance with the presently disclosed binder composition as a result of a ratio (A/B) of the surface acid content A of the particulate polymer and the acid content B in the aqueous phase being within a specific range.

<Particulate Polymer>

The particulate polymer is a component that functions as a binder and that, in an electrode mixed material layer formed using a slurry composition that contains the binder composition, holds components such as an electrode active material so that they do not detach from the electrode mixed material layer and enables adhesion of an electrode and a separator through the electrode mixed material layer.

The particulate polymer is water-insoluble particles that are formed of a specific polymer. Note that when particles are referred to as "water-insoluble" in the present disclosure, this means that when 0.5 g of polymer is dissolved in 100 g of water at a temperature of 25° C., insoluble content is 90 mass % or more.

[Polymer]

The polymer forming the particulate polymer is a copolymer that includes a block region formed of an aromatic vinyl monomer unit (hereinafter, also referred to simply as an "aromatic vinyl block region") and a macromolecule chain section in which repeating units other than aromatic vinyl monomer units are linked (hereinafter, also referred to simply as the "other region"). The aromatic vinyl block region and the other region are present adjacently in the polymer. Moreover, the polymer may include just one aromatic vinyl block region or may include a plurality of aromatic vinyl block regions. Likewise, the polymer may include just one other region or may include a plurality of other regions.

—Aromatic Vinyl Block Region—

The aromatic vinyl block region is a region that only includes an aromatic vinyl monomer unit as a repeating unit as previously described.

A single aromatic vinyl block region may be composed of just one type of aromatic vinyl monomer unit or may be composed of a plurality of types of aromatic vinyl monomer units, but is preferably composed of just one type of aromatic vinyl monomer unit.

Moreover, a single aromatic vinyl block region may include a coupling moiety (i.e., aromatic vinyl monomer units composing a single aromatic vinyl block region may be linked via a coupling moiety).

In a case in which the polymer includes a plurality of aromatic vinyl block regions, the types and proportions of aromatic vinyl monomer units composing these aromatic vinyl block regions may be the same or different for each of the aromatic vinyl block regions, but are preferably the same.

Examples of aromatic vinyl monomers that can form a constituent aromatic vinyl monomer unit of the aromatic vinyl block region in the polymer include aromatic monovinyl compounds such as styrene, styrene sulfonic acid and salts thereof, α-methylstyrene, p-t-butylstyrene, butoxystyrene, vinyltoluene, chlorostyrene, and vinylnaphthalene. Of these aromatic vinyl monomers, styrene is preferable from a viewpoint of increasing the thermal stability of the particulate polymer and improving the peel strength and moisture resistance of an electrode. Note that although one of these aromatic vinyl monomers may be used individually or two or more of these aromatic vinyl monomers may be used in combination, it is preferable that one of these aromatic vinyl monomers is used individually.

The proportion constituted by an aromatic vinyl monomer unit in the polymer forming the particulate polymer when the amount of all repeating units (monomer units and structural units) in the polymer is taken to be 100 mass % is preferably 10 mass % or more, and more preferably 15 mass % or more, and is preferably 50 mass % or less, and more preferably 45 mass % or less. When the proportion constituted by an aromatic vinyl monomer unit in the polymer is within any of the specific ranges set forth above, a balance of strength and flexibility of an electrode mixed material layer formed using the binder composition can be maintained well, and the peel strength of an electrode can be improved.

Note that the proportion constituted by an aromatic vinyl monomer unit in the polymer is normally the same as the proportion constituted by the aromatic vinyl block region in the polymer.

—Other Region—

As previously described, the other region is a region that includes only repeating units other than an aromatic vinyl monomer unit (hereinafter, also referred to simply as "other repeating units") as repeating units.

Note that a single other region may be composed of one type of other repeating unit or may be composed of a plurality of types of other repeating units.

Moreover, a single other region may include a coupling moiety (i.e., other repeating units composing a single other region may be linked via a coupling moiety).

Furthermore, the other region may include a graft portion and/or a cross-linked structure.

In a case in which the polymer includes a plurality of other regions, the types and proportions of other repeating units composing these other regions may be the same or different for each of the other regions.

Although no specific limitations are placed on other repeating units that may compose the other region of the polymer, an aliphatic conjugated diene monomer unit and/or an alkylene structural unit are preferable from a viewpoint of improving the peel strength of an electrode, for example. In other words, the polymer preferably includes a block region formed of an aliphatic conjugated diene monomer unit and/or an alkylene structural unit as the other region.

Examples of aliphatic conjugated diene monomers that can form an aliphatic conjugated diene monomer unit include conjugated diene compounds having a carbon number of 4 or more such as 1,3-butadiene, isoprene, 2,3-dimethyl-1,3-butadiene, and 1,3-pentadiene. One of these aliphatic conjugated diene monomers may be used individually, or two or more of these aliphatic conjugated diene monomers may be used in combination. Of these aliphatic conjugated diene monomers, 1,3-butadiene and isoprene are preferable from a viewpoint of improving the peel strength of an electrode. Moreover, 1,3-butadiene is more preferable from a viewpoint of increasing the thermal stability of the particulate polymer and further improving the peel strength and moisture resistance of an electrode.

An alkylene structural unit is a repeating unit that is composed of only an alkylene structure represented by a general formula: $-C_nH_{2n}-$ (n is an integer of 2 or more).

Although the alkylene structural unit may be linear or branched, the alkylene structural unit is preferably linear (i.e., is preferably a linear alkylene structural unit). Moreover, the carbon number of the alkylene structural unit is preferably 4 or more (i.e., n in the preceding general formula is preferably an integer of 4 or more).

No specific limitations are placed on the method by which an alkylene structural unit is introduced into the polymer. A method in which the polymer is obtained by hydrogenating a block polymer including an aliphatic conjugated diene monomer unit and a block region formed of an aromatic vinyl monomer unit in order to convert the aliphatic conjugated diene monomer unit to an alkylene structural unit, for example, is preferable in terms of ease of production of the polymer.

The aliphatic conjugated diene monomer used in this method may be any of the conjugated diene compounds having a carbon number of 4 or more that were previously described as aliphatic conjugated diene monomers that can form an aliphatic conjugated diene monomer unit, of which, 1,3-butadiene and isoprene are preferable from a viewpoint of improving the peel strength of an electrode. Moreover, 1,3-butadiene is more preferable from a viewpoint of increasing the thermal stability of the particulate polymer and further improving the peel strength and moisture resistance of an electrode. In other words, the alkylene structural unit is preferably a structural unit obtained through hydrogenation of an aliphatic conjugated diene monomer unit (i.e., a hydrogenated aliphatic conjugated diene unit), is more preferably a structural unit obtained through hydrogenation of a 1,3-butadiene unit (i.e., a hydrogenated 1,3-butadiene unit) or a structural unit obtained through hydrogenation of an isoprene unit (i.e., a hydrogenated isoprene unit), and is even more preferably a hydrogenated 1,3-butadiene unit. Selective hydrogenation of an aliphatic conjugated diene monomer unit can be carried out by a commonly known method such as an oil-layer hydrogenation method or a water-layer hydrogenation method.

Moreover, a structural unit obtained through cross-linking of an aliphatic conjugated diene monomer unit is preferably included as another repeating unit in the other region of the polymer from a viewpoint of improving the injectability of electrolyte solution into an electrode mixed material layer, for example, though this is not a specific limitation. In other words, the polymer forming the particulate polymer is preferably a polymer obtained through cross-linking of a block polymer that includes an aliphatic conjugated diene monomer unit and a block region formed of an aromatic vinyl monomer unit.

A structural unit obtained through cross-linking of an aliphatic conjugated diene monomer unit can be introduced into the polymer by performing cross-linking of a block polymer that includes an aliphatic conjugated diene monomer unit and a block region formed of an aromatic vinyl monomer unit.

The cross-linking can be performed using a radical initiator such as a redox initiator that is a combination of an oxidant and a reductant, for example, but is not specifically limited to being performed in this manner. Examples of oxidants that can be used include organic peroxides such as diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide. Examples of reductants that can be used include compounds that include a metal ion in a reduced state such as ferrous sulfate and copper(I) naphthenate; sulfonic acid compounds such as sodium methanesulfonate; and amine compounds such as dimethylaniline. One of these organic peroxides or reductants may be used individually, or two or more of these organic peroxides or reductants may be used in combination.

Note that the cross-linking may be performed in the presence of a cross-linker such as a polyvinyl compound (divinylbenzene, etc.), a polyallyl compound (diallyl phthalate, triallyl trimellitate, diethylene glycol bis(allyl carbonate), etc.), or any of various glycols (ethylene glycol diacrylate, etc.). Moreover, the cross-linking can be performed through irradiation with active energy rays such as γ-rays.

The total amount of an aliphatic conjugated diene monomer unit and an alkylene structural unit in the polymer forming the particulate polymer when the amount of all repeating units (monomer units and structural units) in the polymer is taken to be 100 mass % is preferably 45 mass % or more, and more preferably 50 mass % or more, and is preferably 85 mass % or less, and more preferably 80 mass % or less. When the total proportion constituted by an aliphatic conjugated diene monomer unit and an alkylene structural unit in the polymer is within any of the ranges set forth above, a balance of strength and flexibility of an electrode mixed material layer formed using the binder composition can be maintained well, and the peel strength of an electrode can be further improved.

The mass ratio of aromatic vinyl monomer units and the total of aliphatic conjugated diene monomer units and alkylene structural units (aromatic vinyl monomer units/total of aliphatic conjugated diene monomer units and alkylene structural units) in the polymer forming the particulate polymer is preferably 15/85 or more, more preferably 20/80 or more, and even more preferably 30/70 or more, and is preferably 50/50 or less, and more preferably 45/55 or less. When the mass ratio of aromatic vinyl monomer units and the total of aliphatic conjugated diene monomer units and alkylene structural units in the polymer forming the particulate polymer is within any of the ranges set forth above, a balance of strength and flexibility of an electrode mixed material layer formed using the binder composition can be maintained well, and the peel strength of an electrode can be further improved.

Note that "aliphatic conjugated diene monomer units" referred to above are inclusive of structural units obtained through cross-linking of aliphatic conjugated diene monomer units.

The other region of the polymer may include repeating units other than an aliphatic conjugated diene monomer unit, a structural unit obtained through cross-linking of an aliphatic conjugated diene monomer unit, and an alkylene structural unit. Specifically, the other region of the polymer may include other monomer units such as an acidic group-containing monomer unit (carboxyl group-containing monomer unit, sulfo group-containing monomer unit, phosphate group-containing monomer unit, etc.), a nitrile group-containing monomer unit (acrylonitrile unit, methacrylonitrile unit, etc.), and a (meth)acrylic acid ester monomer unit (acrylic acid alkyl ester unit, methacrylic acid alkyl ester unit, etc.). In the present disclosure, "(meth)acrylic acid" is used to indicate "acrylic acid" and/or "methacrylic acid".

Of these other monomer units, the inclusion of an acidic group-containing monomer unit in the other region of the polymer is preferable from a viewpoint of adjusting the surface acid content of the particulate polymer to a suitable level and further improving the viscosity stability of a slurry composition.

Note that the acidic group of an acidic group-containing monomer unit may form a salt with an alkali metal, ammonia, or the like.

Examples of carboxyl group-containing monomers that can form a carboxyl group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as butyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, dimethylmaleic anhydride, and citraconic anhydride.

An acid anhydride that produces a carboxyl group through hydrolysis can also be used as a carboxyl group-containing monomer.

Furthermore, an ethylenically unsaturated polybasic carboxylic acid such as butene tricarboxylic acid, a partial ester of an ethylenically unsaturated polybasic carboxylic acid such as monobutyl fumarate or mono-2-hydroxypropyl maleate, or the like can be used as a carboxyl group-containing monomer.

Examples of sulfo group-containing monomers that can form a sulfo group-containing monomer unit include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers that can form a phosphate group-containing monomer unit include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of the monomers described above may be used individually, or two or more of the monomers described above may be used in combination. From a viewpoint of even further improving the viscosity stability of a slurry composition, it is preferable to use a carboxyl group-containing monomer or a sulfo group-containing monomer, more preferable to use a carboxyl group-containing monomer, even more preferable to use methacrylic acid, itaconic acid, or acrylic acid, and particularly preferable to use methacrylic acid as an acidic group-containing monomer that can form an acidic group-containing monomer unit.

In a case in which the polymer forming the particulate polymer includes an acidic group-containing monomer unit, the proportion constituted by the acidic group-containing monomer unit in the polymer when the amount of all repeating units in the polymer is taken to be 100 mass % is preferably 0.1 mass % or more, more preferably 0.5 mass % or more, and even more preferably 1 mass % or more, and is preferably 20 mass % or less, more preferably 18 mass % or less, and even more preferably 15 mass % or less. When the proportion constituted by an acidic group-containing monomer unit in the polymer is not less than any of the lower limits set forth above, the viscosity stability of a slurry composition produced using the binder composition can be further increased. On the other hand, when the proportion constituted by an acidic group-containing monomer unit in the polymer is not more than any of the upper limits set forth above, the internal resistance of a secondary battery including an electrode that has been formed using the binder composition can be reduced.

Other monomers units such as the acidic group-containing monomer unit, nitrile group-containing monomer unit, and (meth)acrylic acid ester monomer unit described above can be introduced into the polymer using any polymerization method, such as graft polymerization, without any specific limitations. Note that in a case in which another monomer unit is introduced by graft polymerization, the polymer includes a graft portion including that other monomer unit and has a structure in which a polymer constituting the graft portion is bonded to a polymer constituting a backbone portion.

The graft polymerization can be performed by a known graft polymerization method without any specific limitations. Specifically, the graft polymerization can be performed using a radical initiator such as a redox initiator that is a combination of an oxidant and a reductant, for example. The oxidant and the reductant can be the same as any of the previously described oxidants and reductants that can be used in cross-linking of a block polymer that includes an aliphatic conjugated diene monomer unit and a block region formed of an aromatic vinyl monomer unit.

Moreover, in a case in which graft polymerization using a redox initiator is to be performed with respect to a block polymer that includes an aliphatic conjugated diene monomer unit and a block region formed of an aromatic vinyl monomer unit, introduction of another monomer unit through graft polymerization and aliphatic conjugated diene monomer unit cross-linking can be caused to proceed concurrently. Note that graft polymerization and cross-linking do not have to be caused to proceed concurrently, and the type of radical initiator and the reaction conditions may be adjusted such that only graft polymerization proceeds.

[Surface Acid Content]

The surface acid content A of the particulate polymer is required to be 0.05 mmol/g or more, is preferably 0.10 mmol/g or more, more preferably 0.20 mmol/g or more, and even more preferably 0.40 mmol/g or more, and is preferably 1.00 mmol/g or less, more preferably 0.80 mmol/g or less, even more preferably 0.70 mmol/g or less, and further preferably 0.60 mmol/g or less. In a situation in which the surface acid content A of the particulate polymer is less than 0.05 mmol/g, the viscosity stability of a slurry composition produced using the binder composition decreases. On the other hand, when the surface acid content A of the particulate polymer is not less than any of the lower limits set forth above, the viscosity stability of a slurry composition can be sufficiently increased. Moreover, when the surface acid content A of the particulate polymer is not less than any of the lower limits set forth above, the peel strength of an electrode formed using the binder composition can be improved. Furthermore, when the surface acid content A of the particulate polymer is not more than any of the upper limits set forth above, the peel strength of an electrode formed using the binder composition can be improved, and the internal resistance of a secondary battery can be reduced.

The surface acid content A of the particulate polymer can be adjusted by altering the types and amounts of monomers used in production of the polymer that serves as the particulate polymer. Specifically, the surface acid content can be increased by increasing the used amount of an acidic group-containing monomer such as a carboxyl group-containing monomer, for example.

[Volume-Average Particle Diameter]

The volume-average particle diameter of the particulate polymer is preferably 0.1 μm or more, more preferably 0.2 μm or more, and even more preferably 0.3 μm or more, and is preferably less than 0.9 μm, more preferably less than 0.7 μm, and even more preferably less than 0.6 μm. When the volume-average particle diameter of the particulate polymer is not less than any of the lower limits set forth above, the internal resistance of a secondary battery can be reduced. On the other hand, when the volume-average particle diameter of the particulate polymer is less than any of the upper limits set forth above, the peel strength of an electrode formed using the binder composition can be improved. Moreover, when the volume-average particle diameter of the particulate polymer is less than any of the upper limits set forth above, the moisture resistance of an electrode formed using the binder composition can be further increased, and the internal resistance of a secondary battery can be reduced.

[Production Method of Particulate Polymer]

The particulate polymer formed of the polymer described above can be produced, for example, through a step of block polymerizing monomers such as an aromatic vinyl monomer and an aliphatic conjugated diene monomer described above in an organic solvent to obtain a solution of a block polymer including an aromatic vinyl block region (block polymer solution production step), a step of adding water to the obtained block polymer solution and performing emulsification to form particles of the block polymer (emulsification step), and a step of performing graft polymerization with respect to the particles of the block polymer to obtain a water dispersion of a particulate polymer formed of a specific polymer (grafting step).

Note that the grafting step may be performed before the emulsification step in production of the particulate polymer. In other words, the particulate polymer may be produced by implementing a step of performing graft polymerization with respect to the block polymer contained in the obtained block polymer solution after the block polymer solution production step to obtain a solution of a specific polymer (grafting step) and subsequently implementing a step of adding water to the obtained solution of the specific polymer and performing emulsification to form particles of the specific polymer and obtain a water dispersion of a particulate polymer (emulsification step).

—Block Polymer Solution Production Step—

No specific limitations are placed on the method of block polymerization in the block polymer solution production step. For example, a block polymer can be produced by adding a second monomer component to a solution obtained through polymerization of a first monomer component differing from the second monomer component, polymerizing the second monomer component, and further repeating addition and polymerization of monomer components as necessary. The organic solvent that is used as a reaction solvent is not specifically limited and can be selected as appropriate depending on the types of monomers and so forth.

A block polymer obtained through block polymerization in this manner is preferably subjected to a coupling reaction using a coupling agent in advance of the subsequently described emulsification step. Through this coupling reaction, it is possible to cause bonding between the ends of diblock structures contained in the block polymer via the coupling agent and to thereby convert these diblock structures to a triblock structure (i.e., reduce the diblock content), for example.

Examples of coupling agents that can be used in the coupling reaction include, but are not specifically limited to, difunctional coupling agents, trifunctional coupling agents, tetrafunctional coupling agents, and coupling agents having a functionality of 5 or higher.

Examples of difunctional coupling agents include difunctional halosilanes such as dichlorosilane, monomethyldichlorosilane, and dichlorodimethylsilane; difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents include trifunctional haloalkanes such as trichloroethane and trichloropropane; trifunctional halosilanes such as methyltrichlorosilane and ethyltrichlorosilane; and trifunctional alkoxysilanes such as methyltrimethoxysilane, phenyltrimethoxysilane, and phenyltriethoxysilane.

Examples of tetrafunctional coupling agents include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane and tetraethoxysilane; and tetrafunctional tin halides such as tin tetrachloride and tin tetrabromide.

Examples of coupling agents having a functionality of 5 or higher include 1,1,1,2,2-pentachloroethane, perchloroethane, pentachlorobenzene, perchlorobenzene, octabromodiphenyl ether, and decabromodiphenyl ether.

One of these coupling agents may be used individually, or two or more of these coupling agents may be used in combination.

Of the examples given above, dichlorodimethylsilane is preferable as the coupling agent. The coupling reaction using the coupling agent results in a coupling moiety that is derived from the coupling agent being introduced into a constituent macromolecule chain (for example, a triblock structure) of the block polymer.

Note that the block polymer solution that is obtained after the block polymerization and optional coupling reaction described above may be subjected to the subsequently described emulsification step in that form or may be subjected to the emulsification step after the block polymer has, as necessary, been hydrogenated as previously described.

—Emulsification Step—

Although no specific limitations are placed on the method of emulsification in the emulsification step, a method in which phase-inversion emulsification is performed with respect to a preliminary mixture of the block polymer solution obtained in the block polymer solution production step described above and an aqueous solution of an emulsifier is preferable, for example. Note that the phase-inversion emulsification can be carried out using a known emulsifier and emulsifying/dispersing device, for example. Specific examples of emulsifying/dispersing devices that can be used include, but are not specifically limited to, batch emulsifying/dispersing devices such as a Homogenizer (product name; produced by IKA), a Polytron (product name; produced by Kinematica AG), and a TK Auto Homo Mixer (product name; produced by Tokushu Kika Kogyo Co., Ltd.); continuous emulsifying/dispersing devices such as a TK Pipeline-Homo Mixer (product name; produced by Tokushu Kika Kogyo Co., Ltd.), a Colloid Mill (product name; produced by Shinko Pantec Co., Ltd.), a Thrasher (product name; produced by Nippon Coke & Engineering Co., Ltd.), a Trigonal Wet Fine Grinding Mill (product name; produced by Mitsui Miike Chemical Engineering Machinery Co., Ltd.), a Cavitron (product name; produced by EUROTEC Ltd.), a Milder (product name; produced by Pacific Machinery & Engineering Co., Ltd.), and a Fine Flow Mill (product name: produced by Pacific Machinery & Engineering Co., Ltd.); high-pressure emulsifying/dispersing devices such as a Microfluidizer (product name; produced by Mizuho Industrial Co., Ltd.), a Nanomizer (product name; produced by Nanomizer Inc.), an APV Gaulin (product name; produced by Gaulin), and a LAB1000 (produced by SPX FLOW, Inc.); membrane emulsifying/dispersing devices such as a Membrane Emulsifier (product name; produced by Reica Co., Ltd.); vibratory emulsifying/dispersing devices such as a Vibro Mixer (product name; produced by Reica Co., Ltd.); and ultrasonic emulsifying/dispersing devices such as an Ultrasonic Homogenizer (product name; produced by Branson). Conditions of the emulsification operation performed by the emulsifying/dispersing device (for example, processing temperature and processing time) may be set as appropriate so as to achieve a desired dispersion state without any specific limitations.

A known method may be used to remove organic solvent from the emulsion obtained after phase-inversion emulsification as necessary, for example, so as to yield a water dispersion of a block polymer that has been formed into particles.

—Grafting Step—

Although no specific limitations are placed on the method of graft polymerization in the grafting step, a method in which graft polymerization and cross-linking of the block polymer are caused to proceed concurrently in the presence of a monomer that is to be graft polymerized using a radical initiator such as a redox initiator is preferable, for example.

The reaction conditions can be adjusted in accordance with the chemical composition of the block polymer, the desired surface acid content, and so forth.

Through the grafting step, it is possible to obtain a water dispersion of a particulate polymer that is formed of a polymer including a block region formed of an aromatic vinyl monomer unit and that has a surface acid content of 0.05 mmol/g or more. Note that in a case in which the grafting step is performed after the emulsification step (i.e., graft polymerization is performed with respect to a block polymer that has been formed into particles), a monomer unit that is introduced by graft polymerization, such as an acidic group-containing monomer unit, tends to be present more abundantly toward the surface of the particulate polymer than at the center of the particulate polymer and is concentrated in a surface layer of the particulate polymer.

<Water-Soluble Macromolecules>

The water-soluble macromolecules are a component that enables good dispersion of components such as the previously described particulate polymer in an aqueous medium.

The water-soluble macromolecules preferably include a hydrophilic group. Moreover, the water-soluble macromolecules are preferably synthetic macromolecules, and more preferably an addition polymer produced through addition polymerization of monomer(s), but are not specifically limited thereto.

Note that the water-soluble macromolecules may be in the form of a salt (salt of water-soluble macromolecules). In other words, the term "water-soluble macromolecules" as used in the present disclosure is also inclusive of salts of the water-soluble macromolecules. Also note that when macromolecules are referred to as "water-soluble" in the present disclosure, this means that when 0.5 g of the macromolecules are dissolved in 100 g of water at a temperature of 25° C., insoluble content is less than 1.0 mass %.

[Hydrophilic Group]

Examples of hydrophilic groups that can be included in the water-soluble macromolecules include a carboxyl group, a sulfo group, a phosphate group, and a hydroxyl group. The water-soluble macromolecules may include just one of these types of hydrophilic groups or may include two or more of these types of hydrophilic groups. Of these examples, an acidic group such as a carboxyl group, a sulfo group, or a phosphate group is preferable, a carboxyl group or a sulfo group is more preferable, and a carboxyl group is even more preferable as a hydrophilic group from a viewpoint of increasing the viscosity stability and improving the coating density of a slurry composition while also inhibiting aggregation of the particulate polymer and the like during application of this slurry composition and improving the handleability of an electrode including an electrode mixed material layer.

No specific limitations are placed on the method by which a hydrophilic group is introduced into the water-soluble macromolecules. Although a polymer may be produced through addition polymerization of a monomer including any of the hydrophilic groups described above (hydrophilic group-containing monomer) so as to obtain water-soluble macromolecules that include a hydrophilic group-containing monomer unit or any polymer may be modified (for example, end modified) so as to obtain water-soluble macromolecules that include any of the hydrophilic groups described above, the former of these methods is preferable.

—Hydrophilic Group-Containing Monomer Unit—

From a viewpoint of increasing the stability and improving the coating density of a slurry composition while also inhibiting aggregation of the particulate polymer and the like during application of this slurry composition and improving the handleability of an electrode including an electrode mixed material layer, the water-soluble macromolecules preferably include at least one acidic group-containing monomer unit selected from the group consisting of a carboxyl group-containing monomer unit, a sulfo group-containing monomer unit, and a phosphate group-containing monomer unit as a hydrophilic group-containing monomer unit, more preferably include either or both of a carboxyl group-containing monomer unit and a sulfo group-containing monomer unit as a hydrophilic group-containing monomer unit, and even more preferably include a carboxyl group-containing monomer unit as a hydrophilic group-containing monomer unit. Note that the water-soluble macromolecules may include just one of the types of hydrophilic group-containing monomer units described above or may include two or more of the types of hydrophilic group-containing monomer units described above.

Examples of carboxyl group-containing monomers that can form a carboxyl group-containing monomer unit, sulfo group-containing monomers that can form a sulfo group-containing monomer unit, and phosphate group-containing monomers that can form a phosphate group-containing monomer unit include the same monomers as can be used for the polymer forming the particulate polymer.

Examples of hydroxyl group-containing monomers that can form a hydroxyl group-containing monomer unit include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^a-COO-(C_qH_{2q}O)_p-H$ (where p represents an integer of 2 to 9, q represents an integer of 2 to 4, and $R^a$ represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth)allyl thioethers of alkylene glycols such as (meth)allyl-2-hydroxyethyl thioether and (meth)allyl-2-hydroxypropyl thioether; and hydroxyl group-containing amides such as N-hydroxymethylacrylamide (N-methylolacrylamide), N-hydroxymethylmethacrylamide, N-hydroxyethylacrylamide, and N-hydroxyethylmethacrylamide.

The proportion constituted by a hydrophilic group-containing monomer unit in the water-soluble macromolecules when the amount of all repeating units in the water-soluble macromolecules is taken to be 100 mass % is preferably 10 mass % or more, more preferably 20 mass % or more, even more preferably 40 mass % or more, and particularly preferably 60 mass % or more. When the proportion constituted by a hydrophilic group-containing monomer unit in the water-soluble macromolecules is 10 mass % or more, it is possible to increase the stability and improve the coating density of a slurry composition while also inhibiting aggregation of the particulate polymer and the like during application of this slurry composition and further improving the handleability of an electrode including an electrode mixed material layer. The upper limit for the proportion constituted by a hydrophilic group-containing monomer unit in the water-soluble macromolecules is not specifically limited and can be 100 mass % or less.

—Other Monomer Units—

The water-soluble macromolecules may include monomer units other than a hydrophilic group-containing monomer unit such as described above (i.e., other monomer units). Any monomer that is copolymerizable with a hydrophilic group-containing monomer such as described above can be used without any specific limitations as another monomer that can form another monomer unit included in the water-soluble macromolecules. Examples of other monomers that may be used include (meth)acrylic acid ester monomers, fluorine atom-containing (meth)acrylic acid ester monomers, and cross-linkable monomers.

Examples of (meth)acrylic acid ester monomers, fluorine atom-containing (meth)acrylic acid ester monomers, and cross-linkable monomers that can be used include those given as examples in JP2015-70245A, for example.

Note that one other monomer may be used individually, or two or more other monomers may be used in combination.

[Preferable Examples of Water-Soluble Macromolecules]

It is preferable to use a polycarboxylic acid as the water-soluble macromolecules, and more preferable to use at least one selected from the group consisting of polyacrylic acid, polymethacrylic acid, and polymaleic acid as the water-soluble macromolecules.

The term "polycarboxylic acid" as used in the present specification refers to a polymer that mainly includes a carboxyl group-containing monomer unit. Specifically, the proportion constituted by a carboxyl group-containing monomer unit in the polycarboxylic acid can be set in any of the same preferable ranges as for the proportion constituted by a hydrophilic group-containing monomer unit in the water-soluble macromolecules described above, and is most preferably 100 mass %. Note that the carboxyl group-containing monomer unit included in the polycarboxylic acid is preferably at least one selected from the group consisting of an acrylic acid unit, a methacrylic acid unit, and a maleic acid unit.

[Production Method of Water-Soluble Macromolecules]

The water-soluble macromolecules can be produced through polymerization of a monomer composition containing the monomer(s) described above, carried out in an aqueous solvent such as water, for example. The proportional content of each monomer in the monomer composition can be set in accordance with the proportional content of each monomer unit in the water-soluble macromolecules.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

Typically used additives such as emulsifiers, dispersants, polymerization initiators, polymerization aids, and molecular weight modifiers can be used in the polymerization. The amounts of these additives may also be the same as typically used. The polymerization conditions can be adjusted as appropriate depending on the polymerization method, the type of polymerization initiator, and so forth.

[Molecular Weight and Content]

No specific limitations are placed on the molecular weight distribution of the water-soluble macromolecules contained in the presently disclosed binder composition.

For example, the content of components having a molecular weight of not less than 1,000 and less than 15,000 among the water-soluble macromolecules of the binder composition is preferably 0.01 parts by mass or more, more preferably 0.05 parts by mass or more, and even more preferably 0.15 parts by mass or more per 100 parts by mass of the particulate polymer, and is preferably 1.50 parts by mass or less, more preferably 0.80 parts by mass or less, and even more preferably 0.50 parts by mass or less per 100 parts by mass of the particulate polymer. When the content of components having a molecular weight of not less than 1,000 and less than 15,000 among the water-soluble macromolecules in the binder composition is not less than any of the lower limits set forth above, the viscosity stability of a slurry composition can be further increased. On the other hand, when the content of components having a molecular weight of not less than 1,000 and less than 15,000 among the water-soluble macromolecules in the binder composition is not more than any of the upper limits set forth above, the moisture resistance of an electrode can be further increased.

Note that the content of components having a molecular weight of not less than 1,000 and less than 15,000 among the water-soluble macromolecules in the binder composition that is referred to in the present disclosure can be calculated, for example, from a ratio of peak areas in a molecular weight distribution diagram that is obtained through measurement of the aqueous phase of the binder composition using a gel permeation chromatograph.

The water-soluble macromolecules in the binder composition may include components other than the components having a molecular weight of not less than 1,000 and less than 15,000 mentioned above (i.e., may include components having a molecular weight of less than 1,000 and/or components having a molecular weight of 15,000 or more).

Note that the content of components having a molecular weight of less than 1,000 and the content of components having a molecular weight of 15,000 or more among the water-soluble macromolecules in the binder composition can be measured by the same method as the measurement method for the content of components having a molecular weight of not less than 1,000 and less than 15,000.

<Other Components>

The presently disclosed binder composition can contain components other than those described above (i.e., other components). For example, the binder composition may contain a known particulate binder (styrene butadiene random copolymer, acrylic polymer, etc.) other than the previously described particulate polymer.

The binder composition may also contain known additives. Examples of such known additives include antioxidants, defoamers, and dispersants (excluding those corresponding to the previously described water-soluble macromolecules). Examples of antioxidants that can be used include hindered phenol antioxidants such as 4-[[4,6-bis(octylthio)-1,3,5-triazin-2-yl]amino]-2,6-di-tert-butylphenol; and phosphite antioxidants such as 3,9-bis(octadecyloxy)-2,4,8,10-tetraoxa-3,9-diphosphaspiro[5.5]undecane.

The binder composition may also contain a small amount of an organic solvent as a solvent other than water to the extent that the desired effects are obtained.

Note that one other component may be used individually, or two or more other components may be used in combination in a freely selected ratio.

<Acid Content in Aqueous Phase of Binder Composition>

The acid content B in the aqueous phase of the binder composition per 1 g of the particulate polymer is required to be 0.03 mmol/g or more, and is preferably 0.05 mmol/g or more, more preferably 0.1 mmol/g or more, and even more preferably 0.2 mmol/g or more. Moreover, the acid content B in the aqueous phase of the binder composition per 1 g of the particulate polymer is required to be 0.8 mmol/g or less, and is preferably 0.5 mmol/g or less, more preferably 0.4 mmol/g or less, and even more preferably 0.3 mmol/g or less. In a situation in which the acid content B in the aqueous phase of the binder composition per 1 g of the particulate polymer is less than 0.03 mmol/g, the viscosity stability of a slurry composition produced using the binder composition decreases. On the other hand, when the acid content B in the aqueous phase of the binder composition per 1 g of the particulate polymer is not less than any of the lower limits set forth above, the viscosity stability of a slurry composition produced using the binder composition can be sufficiently increased. Moreover, in a situation in which the acid content B in the aqueous phase of the binder composition per 1 g of the particulate polymer is more than 0.8 mmol/g, the moisture resistance of an electrode formed using the binder composition decreases. On the other hand, when the acid content B in the aqueous phase of the binder composition per 1 g of the particulate polymer is not more than any of the upper limits set forth above, the moisture resistance of an electrode formed using the binder composition can be sufficiently increased. Moreover, when the acid content B in the aqueous phase of the binder composition per 1 g of the particulate polymer is not more than any of the upper limits set forth above, the peel strength of an electrode can be improved, and the internal resistance of a secondary battery can be reduced.

Note that the acid content B in the aqueous phase of the binder composition per 1 g of the particulate polymer can be regarded as the acid content of the water-soluble macromolecules per 1 g of the particulate polymer.

A ratio (A/B) of the surface acid content A of the particulate polymer and the acid content B of the binder composition per 1 g of the particulate polymer is required to be 0.5 or more, and is preferably 0.8 or more, more preferably 1.0 or more, and even more preferably 2.0 or more. Moreover, this ratio (A/B) is required to be 5.0 or less, and is preferably 4.0 or less, and more preferably 3.0 or less. In a situation in which the ratio (A/B) of the surface acid content A of the particulate polymer and the acid content B in the aqueous phase of the binder composition is less than 0.5, the viscosity stability of a slurry composition and the moisture resistance of an electrode in which the binder composition is used decrease. On the other hand, when the ratio (A/B) of the surface acid content A of the particulate polymer and the acid content B in the aqueous phase of the binder composition is not less than any of the lower limits set forth above, the viscosity stability of a slurry composition and the moisture resistance of an electrode in which the binder composition is used can be sufficiently increased. Moreover, when the ratio (A/B) of the surface acid content A of the particulate polymer and the acid content B in the aqueous phase of the binder composition is not less than any of the lower limits set forth above, the internal resistance of a secondary battery can also be reduced. Furthermore, in a situation in which the ratio (A/B) of the surface acid content A of the particulate polymer and the acid content B in the aqueous phase of the binder composition is more than 5.0, the viscosity stability of a slurry composition produced using the binder composition decreases. On the other hand, when the ratio (A/B) of the surface acid content A of the particulate polymer and the acid content B in the aqueous phase of the binder composition is not more than any of the upper limits set forth above, the viscosity stability of a slurry composition produced using the binder composition can be sufficiently increased. Moreover, when the ratio (A/B) of the surface acid content A of the particulate polymer and the acid content B in the aqueous phase of the binder composition is not more than any of the upper limits set forth above, the peel strength of an electrode can be improved, and the internal resistance of a secondary battery can be reduced.

(Production Method of Binder Composition)

The presently disclosed method of producing a binder composition is a method of producing the presently disclosed binder composition set forth above and includes at least a purification step of removing a portion of the water-soluble macromolecules from a mixture that contains the particulate polymer, the water-soluble macromolecules, and water. Implementing the purification step set forth above enables simple production of a binder composition in which the acid content B in the aqueous phase and a ratio (A/B) of the surface acid content A of the particulate polymer and the acid content B in the aqueous phase are within the previously described specific ranges. Consequently, it is easy to obtain a binder composition for a non-aqueous secondary battery with which it is possible to form a slurry composition for a non-aqueous secondary battery electrode having excellent viscosity stability and an electrode for a non-aqueous secondary battery having excellent moisture resistance.

Note that the presently disclosed method of producing a binder composition may include other steps besides the purification step described above.

Also note that the presently disclosed binder composition set forth above can be produced by a method other than the presently disclosed method of producing a binder composition.

<Purification Step>

In the purification step, a portion of the water-soluble macromolecules is removed from a mixture that contains the particulate polymer, the water-soluble macromolecules, and water. The mixture containing the particulate polymer, the water-soluble macromolecules, and water may, for example, be a water dispersion of the particulate polymer that is obtained through the production method of the particulate polymer previously described in the "Binder composition" section. Note that in the previously described production method, some of a monomer such as an acidic group-containing monomer that is used in the grafting step undergoes polymerization only among itself without undergoing graft polymerization with the block polymer, which causes the formation of water-soluble macromolecules and thus results in water-soluble macromolecules being contained in the water dispersion of the particulate polymer that is obtained.

By removing a portion of the water-soluble macromolecules from the mixture in the purification step, it is easy to adjust the acid content B in the aqueous phase of the obtained binder composition and the ratio (A/B) of the surface acid content A of the particulate polymer and the acid content B in the aqueous phase to within the previously described specific ranges.

The method by which a portion of the water-soluble macromolecules is removed from the mixture containing the particulate polymer, the water-soluble macromolecules, and water is not specifically limited so long as the desired effects are obtained and can, for example, be a method such as filtration or centrifugal separation. Of these methods, filtration is preferable from a viewpoint of removal rate. Specifically, a portion of the water-soluble macromolecules is preferably removed from the mixture containing the particulate polymer, the water-soluble macromolecules, and water by the following filtration method. In this method, the mixture is loaded into a vessel (feedstock vessel) that is connected to a system including a filtration membrane and is circulated by a metering pump while performing microfiltration. Microfiltration is continued while supplementing water into the feedstock vessel in an amount corresponding to the weight of permeate discharged outside of the filtration membrane, and then the liquid in the feedstock vessel can subsequently be collected as a binder composition.

The mixture used in microfiltration can be adjusted to a desired solid content concentration and pH.

Moreover, the system used in microfiltration may be a Microza Pencil Module-type Module Tabletop Filtration Unit PX-02001 produced by Asahi Kasei Corporation or the like.

The pore diameter of the filtration membrane included in the system can be set as appropriate within a range the yields the desired effects.

Moreover, conditions such as the circulation flow rate and the filtration time in microfiltration can be adjusted as appropriate within ranges that yield the desired effects.

(Slurry Composition for Non-Aqueous Secondary Battery Electrode)

The presently disclosed slurry composition is a composition that is used for forming an electrode mixed material layer of an electrode. The presently disclosed slurry composition contains the binder composition set forth above and further contains an electrode active material. In other words, the presently disclosed slurry composition contains the previously described particulate polymer, water-soluble macromolecules, an electrode active material, and water, and optionally further contains other components. The presently disclosed slurry composition has excellent viscosity stability as a result of containing the binder composition set forth above. Moreover, the presently disclosed slurry composition can be used to form an electrode having excellent moisture resistance.

<Binder Composition>

The binder composition is the presently disclosed binder composition set forth above that contains a particulate polymer formed of a specific polymer and in which the acid content B in the aqueous phase and the ratio of the surface acid content A of the particulate polymer and the acid content B in the aqueous phase are within specific ranges.

No specific limitations are placed on the amount of the binder composition that is compounded in the slurry composition. For example, the amount of the binder composition can be set as an amount such that the amount of the particulate polymer is not less than 0.5 parts by mass and not more than parts by mass in terms of solid content per 100 parts by mass of the electrode active material.

<Electrode Active Material>

Any known electrode active material that is used in secondary batteries can be used as the electrode active material without any specific limitations. Specifically, examples of electrode active materials that can be used in an electrode mixed material layer of a lithium ion secondary battery, which is one example of a secondary battery, include the following electrode active materials, but are not specifically limited thereto.

[Positive Electrode Active Material]

A positive electrode active material that is compounded in a positive electrode mixed material layer of a positive electrode in a lithium ion secondary battery may, for example, be a compound that includes a transition metal such as a transition metal oxide, a transition metal sulfide, or a complex metal oxide of lithium and a transition metal. Examples of the transition metal include Ti, V, Cr, Mn, Fe, Co, Ni, Cu, and Mo.

Specific examples of positive electrode active materials that may be used include, but are not specifically limited to, lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a lithium-rich spinel compound represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

Note that one of the positive electrode active materials described above may be used individually, or two or more of the positive electrode active materials described above may be used in combination.

[Negative Electrode Active Material]

A negative electrode active material that is compounded in a negative electrode mixed material layer of a negative electrode in a lithium ion secondary battery may, for example, be a carbon-based negative electrode active material, a metal-based negative electrode active material, or a negative electrode active material that is a combination thereof.

A carbon-based negative electrode active material can be defined as an active material that contains carbon as its main framework and into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon; and graphitic materials such as natural graphite and artificial graphite.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); and an oxide, sulfide, nitride, silicide, carbide, or phosphide of any of the preceding examples. Moreover, an oxide such as lithium titanate can be used.

Note that one of the negative electrode active materials described above may be used individually, or two or more of the negative electrode active materials described above may be used in combination.

<Other Components>

Examples of other components that can be contained in the slurry composition include, but are not specifically limited to, conductive materials and the same components as other components that can be contained in the presently disclosed binder composition. Note that one other component may be used individually, or two or more other components may be used in combination in a freely selected ratio.

<Production of Slurry Composition>

No specific limitations are placed on the method by which the slurry composition is produced.

For example, the slurry composition can be produced by mixing the binder composition, the electrode active material, and other components that are used as necessary in the presence of an aqueous medium.

Note that a solvent such as water used in production of the slurry composition is also inclusive of solvent that was contained in the binder composition. The mixing method is not specifically limited and can be mixing using a typically used stirrer or disperser.

(Electrode for Non-Aqueous Secondary Battery)

The presently disclosed electrode for a non-aqueous secondary battery includes an electrode mixed material layer formed using the slurry composition for a non-aqueous secondary battery electrode set forth above. Consequently, the electrode mixed material layer is formed of a dried product of the slurry composition set forth above, normally contains an electrode active material, a component derived from a particulate polymer, and water-soluble macromolecules, and optionally contains other components. It should be noted that components contained in the electrode mixed material layer are components that were contained in the slurry composition for a non-aqueous secondary battery electrode. Furthermore, the preferred ratio of these components in the electrode mixed material layer is the same as the preferred ratio of these components in the slurry composition. Although the particulate polymer is present in a particulate form in the slurry composition, the particulate polymer may have a particulate form or any other form in the electrode mixed material layer formed using the slurry composition.

The presently disclosed electrode for a non-aqueous secondary battery has excellent moisture resistance as a result of the electrode mixed material layer being formed using the slurry composition for a non-aqueous secondary battery electrode set forth above.

<Production of Electrode for Non-Aqueous Secondary Battery>

The electrode mixed material layer of the presently disclosed electrode for a non-aqueous secondary battery can be formed by any of the following methods, for example.

(1) A method in which the presently disclosed slurry composition is applied onto the surface of a current collector and is then dried (2) A method in which a current collector is immersed in the presently disclosed slurry composition and is then dried (3) A method in which the presently disclosed slurry composition is applied onto a releasable substrate and is dried to produce an electrode mixed material layer that is then transferred onto the surface of a current collector Of these methods, method (1) is particularly preferable since it allows simple control of the thickness of the electrode mixed material layer. In more detail, method (1) includes a step of applying the slurry composition onto a current collector (application step) and a step of drying the slurry composition that has been applied onto the current collector to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

[Drying Step]

The slurry composition on the current collector can be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector as described above, an electrode mixed material layer is formed on the current collector, thereby providing an electrode for a non-aqueous secondary battery that includes the current collector and the electrode mixed material layer.

After the drying step, the electrode mixed material layer may be further subjected to a pressing process, such as mold pressing or roll pressing. The pressing process improves close adherence of the electrode mixed material layer and the current collector and enables further densification of the obtained electrode mixed material layer. Furthermore, in a case in which the electrode mixed material layer contains a curable polymer, the polymer is preferably cured after the electrode mixed material layer has been formed.

(Non-Aqueous Secondary Battery)

The presently disclosed non-aqueous secondary battery includes a positive electrode, a negative electrode, an electrolyte solution, and a separator, and has the electrode for a non-aqueous secondary battery set forth above as at least one of the positive electrode and the negative electrode. The presently disclosed non-aqueous secondary battery can display excellent battery characteristics as a result of being produced by using the electrode for a non-aqueous secondary battery set forth above as at least one of the positive electrode and the negative electrode.

Although the following describes, as one example, a case in which the secondary battery is a lithium ion secondary battery, the presently disclosed secondary battery is not limited to the following example.

<Electrodes>

Examples of electrodes other than the presently disclosed electrode for a non-aqueous secondary battery set forth above that can be used in the presently disclosed non-aqueous secondary battery include known electrodes that are used in production of secondary batteries without any specific limitations. Specifically, an electrode obtained by forming an electrode mixed material layer on a current collector by a known production method may be used as an electrode other than the presently disclosed electrode for a non-aqueous secondary battery set forth above.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Separator>

The separator is not specifically limited and can be a separator such as described in JP2012-204303A, for example. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the volumetric capacity.

The presently disclosed secondary battery can be produced by, for example, stacking the positive electrode and the negative electrode with the separator in-between, performing rolling, folding, or the like of the resultant laminate, as necessary, in accordance with the battery shape, placing the laminate in a battery container, injecting the electrolyte solution into the battery container, and sealing the battery container. The electrode for a non-aqueous secondary battery set forth above is used as at least one of the positive electrode and the negative electrode in the presently disclosed non-aqueous secondary battery, and is preferably used as the negative electrode. The presently disclosed non-aqueous secondary battery may be provided with an overcurrent preventing device such as a fuse or a PTC device; an expanded metal; or a lead plate as necessary in order to prevent pressure increase inside the secondary battery and occurrence of overcharging or overdischarging. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure and evaluate the proportion constituted by each monomer unit in a polymer, the volume-average particle diameter of a particulate polymer, the surface acid content of a particulate polymer, the acid content in an aqueous phase of a binder composition per 1 g of a particulate polymer, the viscosity stability of a slurry composition, the peel strength and moisture resistance of an electrode, and the internal resistance of a secondary battery.

<Proportion of Each Monomer Unit in Polymer>

A coagulated material obtained by coagulating a binder composition in methanol was vacuum dried at a temperature of 100° C. for 5 hours to obtain a measurement sample of a particulate polymer. Next, the intensities of peaks respectively attributed to aromatic vinyl monomer units, aliphatic conjugated diene monomer units, and acidic group-containing monomer units included in the measurement sample were calculated by $^1$H-NMR. The peak intensity attributed to each monomer unit as a proportion relative to the total peak intensity was taken to be the proportion constituted by that monomer unit in a polymer forming the particulate polymer.

<Volume-Average Particle Diameter of Particulate Polymer>

The volume-average particle diameter (D50) of a particulate polymer contained in a binder composition was measured using a laser diffraction particle diameter distribution analyzer (produced by Beckman Coulter, Inc.; product name: LS-230). Specifically, a water dispersion obtained by adjusting the binder composition containing the particulate polymer to a solid content concentration of 0.1 mass % was measured in the analyzer, and the particle diameter at which, in the obtained particle size distribution (by volume), cumulative volume calculated from a small diameter end of the distribution reached 50% was determined as the volume-average particle diameter (μm).

<Surface Acid Content of Particulate Polymer and Acid Content in Aqueous Phase of Binder Composition>

An obtained binder composition was diluted with deionized water so as to adjust the solid content concentration of a particulate polymer to 3%. The adjusted sample was subsequently adjusted to pH 12.0 with 3% sodium hydroxide aqueous solution. The pH adjusted sample, in an amount of 1.5 g in terms of solid content of the particulate polymer, was collected in a 100 mL beaker, and then 3 g of an aqueous solution of EMULGEN 120 (produced by Kao Corporation) diluted to 0.2% and 1 g of an aqueous solution of SM5512 (produced by Dow Corning Toray Co., Ltd.) diluted to 1% were added thereto. These materials were uniformly stirred by a stirrer while 0.1 N hydrochloric acid aqueous solution was added thereto at a rate of 0.5 mL/30 s and while electrical conductivity was measured at intervals of 30 seconds.

The obtained electrical conductivity data was plotted on a graph with electrical conductivity on a vertical axis (Y coordinate axis) and cumulative amount of added hydrochloric acid on a horizontal axis (X coordinate axis). In this manner, a hydrochloric acid amount-electrical conductivity curve with three inflection points such as illustrated in FIG. 1 was obtained. The X coordinates of the three inflection points and the end point of hydrochloric acid addition were denoted as P1, P2, P3, and P4 in order from the smallest value. Linear approximations L1, L2, L3, and L4 were determined by the least squares method for data in 4 sections corresponding to X coordinates of: zero to coordinate P1; coordinate P1 to coordinate P2; coordinate P2 to coordinate P3; and coordinate P3 to coordinate P4. An X coordinate of an intersection point of the linear approximation L1 and the linear approximation L2 was taken to be A1, an X coordinate of an intersection point of the linear approximation L2 and the linear approximation L3 was taken to be A2, and an X coordinate of an intersection point of the linear approximation L3 and the linear approximation L4 was taken to be A3.

The surface acid content A per 1 g of the particulate polymer (surface acid content of particulate polymer) was determined as a hydrochloric acid-equivalent value (mmol/g) from the following formula (a).

$$\text{Surface acid content } A \text{ per 1 g of particulate polymer} = (A2-A1)/1.5 \text{ g} \qquad (a)$$

In addition, the acid content B in the aqueous phase of the binder composition per 1 g of the particulate polymer was determined as a hydrochloric acid-equivalent value (mmol/g) from the following formula (b).

$$\text{Acid content } B \text{ in aqueous phase of binder composition per 1 g of particulate polymer} = (A3-A2)/1.5 \text{ g} \qquad (b)$$

<Viscosity Stability of Slurry Composition>

The viscosity η0 of an obtained slurry composition was measured using a B-type viscometer (produced by Toki Sangyo Co., Ltd.; product name: TVB-10; rotation speed: 60 rpm). Next, the slurry composition that had undergone viscosity measurement was stirred for 24 hours using a planetary mixer (rotation speed: 60 rpm), and the viscosity η1 of the slurry composition that had been stirred was then measured using the same B-type viscometer (rotation speed: 60 rpm) as described above. A viscosity change rate Δη of the slurry composition between before and after stirring was calculated (Δη={(η0−η1)/η0}×100(%)), and the viscosity stability of the slurry composition was evaluated by the following standard. Note that the temperature during viscosity measurement was 25° C. An absolute value |Δη| for the viscosity change rate that is closer to 0 indicates that the slurry composition has better viscosity stability.

A: Viscosity change rate absolute value |Δη| of not less than 0% and less than 10%
B: Viscosity change rate absolute value |Δη| of not less than 10% and less than 20%
C: Viscosity change rate absolute value |Δη| of not less than 20% and less than 30%
D: Viscosity change rate absolute value |Δη| of not less than 30%

<Peel Strength of Electrode>

A produced negative electrode was cut out as a rectangle of 100 mm in length and 10 mm in width to obtain a test specimen. The test specimen was placed with the surface of the negative electrode mixed material layer facing downward, and cellophane tape was affixed to the surface of the negative electrode mixed material layer. Cellophane tape prescribed by JIS Z1522 was used as the cellophane tape. Moreover, the cellophane tape was fixed to a test stage. Thereafter, one end of the current collector was pulled vertically upward at a pulling speed of 50 mm/min to peel off the current collector, and the stress during this peeling was measured. Three measurements were made in this manner. An average value of the measurements was determined and was taken to be the peel strength (A) of the electrode. An evaluation was made by the following standard using the peel strength in Comparative Example 2 as a reference. A larger peel strength indicates that the negative electrode mixed material layer has larger binding strength to the current collector, and thus indicates larger close adherence strength.

A: Not less than 1.5 times peel strength in Comparative Example 2
B: Not less than 1.3 times and less than 1.5 times peel strength in Comparative Example 2
C: Not less than 1.0 times and less than 1.3 times peel strength in Comparative Example 2
D: Less than 1.0 times peel strength in Comparative Example 2

<Moisture Resistance of Electrode>

A produced negative electrode was stored for 144 hours in a constant temperature and constant humidity tank in which conditions of a temperature of 25° C. and a humidity of 85% were set and was subsequently stored for 24 hours in a dry room having a dew point of −60° C. A rectangle of 100 mm in length and 10 mm in width was then cut out from the negative electrode as a test specimen. The test specimen was placed with the surface of the negative electrode mixed material layer facing downward, and cellophane tape was affixed to the surface of the negative electrode mixed material layer. Cellophane tape prescribed by JIS Z1522 was used as the cellophane tape. Moreover, the cellophane tape was fixed to a test stage. Thereafter, one end of the current collector was pulled vertically upward at a pulling speed of 50 mm/min to peel off the current collector, and the stress during this peeling was measured. Three measurements were made in this manner. An average value of the measurements was determined and was taken to be the peel strength (B) of the electrode after storage in a high-humidity environment. A peel strength maintenance rate was calculated from the peel strength (A) of the electrode straight after production, which was obtained in the measurement method of electrode peel strength described above, and the peel strength (B) of the electrode after storage in a high-humidity environment through a calculation formula: peel strength maintenance rate={(B)/(A)}×100(%), and was evaluated by the following standard. A higher peel strength maintenance rate indicates that the electrode has better moisture resistance.

A: Peel strength maintenance rate of not less than 95%

B: Peel strength maintenance rate of not less than 85% and less than 95%

C: Peel strength maintenance rate of not less than 75% and less than 85%

D: Peel strength maintenance rate of less than 75%

<Internal Resistance of Secondary Battery>

Measurement of IV resistance as described below was performed in order to evaluate the internal resistance of a lithium ion secondary battery. The lithium ion secondary battery was subjected to conditioning in which it underwent 3 cycles of an operation of charging to a voltage of 4.2 V with a 0.1C charge rate, resting for 10 minutes, and subsequently CC discharging to 3.0 V with a 0.1C discharge rate at a temperature of 25° C. The lithium ion secondary battery was subsequently charged to 3.75 V at 1C (C is a value expressed by rated capacity (mA)/1 hour (h)) in a −10° C. atmosphere and was then subjected to 20 seconds of charging and 20 seconds of discharging centered around 3.75 V at each of 0.5C, 1.0C, 1.5C, and 2.0C. For each of these cases, the battery voltage after 15 seconds at the charging side was plotted against a current value, and the gradient of this plot was determined as the IV resistance (Ω). The obtained value (Ω) for the IV resistance was evaluated by the following standard through comparison with the IV resistance in Comparative Example 2. A smaller value for the IV resistance indicates that the secondary battery has lower internal resistance.

A: Less than 85% of IV resistance in Comparative Example 2

B: Not less than 85% and less than 95% of IV resistance in Comparative Example 2

C: Not less than 95% and less than 105% of IV resistance in Comparative Example 2

D: Not less than 105% of IV resistance in Comparative Example 2

Example 1

<Production of Binder Composition for Non-Aqueous Secondary Battery Negative Electrode>
[Production of Cyclohexane Solution of Block Polymer]

A pressure-resistant reactor was charged with 233.3 kg of cyclohexane, 54.2 mmol of N,N,N',N'-tetramethylethylenediamine (TMEDA), and 30.0 kg of styrene as an aromatic vinyl monomer. These materials were stirred at 40° C. while 1806.5 mmol of n-butyllithium as a polymerization initiator was added thereto, and then 1 hour of polymerization was performed under heating at 50° C. The polymerization conversion rate of styrene was 100%. Next, 70.0 kg of 1,3-butadiene as an aliphatic conjugated diene monomer was continuously added into the pressure-resistant reactor over 1 hour while performing temperature control to maintain a temperature of 50° C. to 60° C. The polymerization reaction was continued for 1 hour more after addition of the 1,3-butadiene was complete. The polymerization conversion rate of 1,3-butadiene was 100%. Next, 722.6 mmol of dichlorodimethylsilane as a coupling agent was added into the pressure-resistant reactor and a coupling reaction was carried out for 2 hours to form a styrene-butadiene coupled block copolymer. Thereafter, 3612.9 mmol of methanol was added to the reaction liquid and was thoroughly mixed therewith to deactivate active ends. Next, 0.05 parts of 4-[[4,6-bis(octylthio)-1,3,5-triazin-2-yl]amino]-2,6-di-tert-butylphenol as a hindered phenol antioxidant and 0.09 parts of 3,9-bis(octadecyloxy)-2,4,8,10-tetraoxa-3,9-diphosphaspiro[5.5]undecane as a phosphite antioxidant were added to 100 parts of the reaction liquid (containing 30.0 parts of polymer component) and were mixed therewith. The resultant mixed solution was gradually added dropwise to hot water of 85° C. to 95° C. to cause volatilization of solvent and obtain a precipitate. The precipitate was pulverized and then hot-air dried at 85° C. to collect a dried product containing a block polymer.

The collected dried product was dissolved in cyclohexane to produce a block polymer solution having a block polymer concentration of 5.0%.

[Phase-Inversion Emulsification]

Sodium alkylbenzene sulfonate was dissolved in deionized water to produce a 0.15% aqueous solution.

After loading 1,000 g of the obtained block polymer solution and 1,400 g of the obtained aqueous solution into a tank, preliminary mixing thereof was performed by stirring. Next, the preliminary mixture was transferred from the tank to a high-pressure emulsifying/dispersing device "LAB1000" (produced by SPX FLOW, Inc.) using a metering pump and was circulated (number of passes: 5) so as to obtain an emulsion in which the preliminary mixture had undergone phase-inversion emulsification.

Next, cyclohexane in the obtained emulsion was evaporated under reduced pressure in a rotary evaporator. The emulsion that had been subjected to evaporation was subsequently subjected to 10 minutes of centrifugation at 7,000 rpm in a centrifuge (produced by Hitachi Koki Co., Ltd.; product name: Himac CR21N), and then the upper layer portion was withdrawn to perform concentration.

Finally, the upper layer portion was filtered through a 100-mesh screen to obtain a water dispersion (block polymer latex) containing a block polymer that had been formed into particles.

[Graft Polymerization and Cross-Linking]

Distilled water was added to dilute the obtained block polymer latex such that the amount of water was 850 parts relative to 100 parts (in terms of solid content) of the block polymer. The diluted block polymer latex was loaded into a stirrer-equipped polymerization reactor that had undergone nitrogen purging and was heated to a temperature of 30° C. under stirring.

In addition, a separate vessel was used to produce a diluted methacrylic acid solution by mixing 4 parts of methacrylic acid as an acidic group-containing monomer and 15 parts of distilled water. The diluted methacrylic acid solution was added over 30 minutes into the polymerization reactor that had been heated to 30° C. so as to add 8 parts of methacrylic acid relative to 100 parts of the block polymer.

A separate vessel was used to produce a solution containing 7 parts of distilled water and 0.01 parts of ferrous sulfate (produced by Chubu Chelest Co., Ltd.; product name: FROST Fe) as a reductant. The obtained solution was added into the polymerization reactor, 0.5 parts of 1,1,3,3-tetramethylbutyl hydroperoxide (produced by NOF Corporation; product name: PEROCTA H) as an oxidant was subsequently added, and a reaction was carried out at 30° C. for 1 hour and then at 70° C. for 2 hours. In this manner, methacrylic acid was graft polymerized with the block polymer that had been formed into particles and cross-linking of the block polymer was performed to yield a water dispersion of a particulate polymer. The polymerization conversion rate was 99%.

[Purification]

The obtained water dispersion of the particulate polymer was diluted to a solid content concentration of 10% through addition of deionized water. The diluted water dispersion of the particulate polymer was then adjusted to pH 8.0 through addition of 5% sodium hydroxide aqueous solution. After loading 1,500 g of the pH adjusted binder composition into a vessel (feedstock vessel) connected to the following system, the binder composition was subjected to microfiltration under conditions indicated below while being circulated using a metering pump.

System: Microza Pencil Module-type Module Tabletop Filtration Unit PX-02001 (produced by Asahi Kasei Corporation)

Filtration membrane: Microza USP-043 (pore diameter: 0.1 μm)

Circulation flow rate: 1,000 g/min

The microfiltration was continued for 30 hours while supplementing water into the feedstock vessel in an amount corresponding to the weight of permeate discharged outside of the system (outside of the filtration membrane), and then liquid inside the feedstock vessel was collected as a binder composition.

The obtained binder composition was used to measure the mass ratio of aromatic vinyl monomer units and aliphatic conjugated diene monomer units in the polymer, the volume-average particle diameter of the particulate polymer, the surface acid content of the particulate polymer, and the acid content in the aqueous phase of the binder composition per 1 g of the particulate polymer. The results are shown in Table 1.

<Production of Slurry Composition for Non-Aqueous Secondary Battery Negative Electrode>

A planetary mixer was charged with 97 parts of graphite (natural graphite; capacity: 360 mAh/g) as a negative electrode active material and 1 part (in terms of solid content) of carboxymethyl cellulose (CMC) as a thickener to obtain a mixture. The obtained mixture was adjusted to a solid content concentration of 60% with deionized water and was subsequently kneaded at a rotation speed of 45 rpm for 60 minutes. Thereafter, the binder composition produced as described above was added in an amount of 1.5 parts in terms of solid content of the particulate polymer, and a further 40 minutes of kneading was performed at a rotation speed of 40 rpm. In addition, deionized water was added to adjust the viscosity (measured by B-type viscometer; temperature: 25° C.; rotor speed: 60 rpm) to 3,000±500 mPa·s and thereby obtain a slurry composition for a negative electrode.

The viscosity stability of the obtained slurry composition for a negative electrode was evaluated. The result is shown in Table 1.

<Formation of Negative Electrode>

The obtained slurry composition for a negative electrode was applied onto electrolytic copper foil of 15 μm in thickness serving as a current collector by a comma coater such as to have a coating weight of 11±0.5 mg/cm$^2$. The copper foil with the slurry composition for a negative electrode applied thereon was then conveyed inside an oven having a temperature of 120° C. for 2 minutes and an oven having a temperature of 130° C. for 2 minutes at a speed of 400 mm/min so as to dry the slurry composition on the copper foil and thereby obtain a negative electrode web including a negative electrode mixed material layer formed on the current collector.

The negative electrode mixed material layer-side of the produced negative electrode web was subsequently roll pressed in an environment having a temperature of 25±3° C. to obtain a negative electrode having a negative electrode mixed material layer density of 1.60 g/cm$^3$. The peel strength and moisture resistance of the negative electrode obtained in this manner were evaluated. The results are shown in Table 1.

<Formation of Positive Electrode>

A planetary mixer was charged with 97 parts of an active material NMC532 (LiNi$_{5/10}$Co$_{2/10}$Mn$_{3/10}$O$_2$) based on a lithium complex oxide of Co—Ni—Mn as a positive electrode active material, 1 part of acetylene black (produced by Denka Company Limited; product name: HS-100) as a conductive material, and 2 parts (in terms of solid content) of polyvinylidene fluoride (produced by Kureha Corporation; product name: #7208) as a binder, and was used to mix these materials. In addition, N-methyl-2-pyrrolidone (NMP) was gradually added as an organic solvent and was mixed therewith by stirring at a temperature of 25±3° C. and a rotation speed of 25 rpm to yield a slurry composition for a positive electrode having a viscosity (measured by B-type viscometer; temperature: 25±3° C.; rotor: M4; rotor speed: 60 rpm) of 3,600 mPa·s.

The obtained slurry composition for a positive electrode was applied onto aluminum foil of 20 μm in thickness serving as a current collector by a comma coater such as to have a coating weight of 20±0.5 mg/cm$^2$. The aluminum foil was then conveyed inside an oven having a temperature of 120° C. for 2 minutes and an oven having a temperature of 130° C. for 2 minutes at a speed of 200 mm/min so as to dry the slurry composition on the aluminum foil and thereby obtain a positive electrode web including a positive electrode mixed material layer formed on the current collector.

The positive electrode mixed material layer-side of the produced positive electrode web was subsequently roll pressed in an environment having a temperature of 25±3° C. to obtain a positive electrode having a positive electrode mixed material layer density of 3.20 g/cm$^3$.

<Preparation of Separator>

A separator made of a single layer of polypropylene (produced by Celgard, LLC.; product name: Celgard 2500) was prepared as a separator composed of a separator substrate.

<Production of Lithium Ion Secondary Battery>

The negative electrode, positive electrode, and separator described above were used to produce a single-layer laminate cell (initial design discharge capacity equivalent to 30 mAh), were then arranged inside aluminum packing, and were subjected to vacuum drying under conditions of 10 hours at 60° C. Thereafter, an $LiPF_6$ solution of 1.0 M in concentration (solvent: mixed solvent of ethylene carbonate (EC)/diethyl carbonate (DEC)=5/5 (volume ratio); additive: containing 2 volume % (solvent ratio) of vinylene carbonate) was loaded into the aluminum packing as an electrolyte solution. The aluminum packing was then closed by heat sealing at a temperature of 150° C. to tightly seal an opening of the aluminum packing, and thereby produce a lithium ion secondary battery. This lithium ion secondary battery was used to evaluate internal resistance. The result is shown in Table 1.

Example 2

A binder composition for a negative electrode, a slurry composition for a negative electrode, a negative electrode, a positive electrode, a separator, and a lithium ion secondary battery were produced in the same way as in Example 1 with the exception that the additive amount of methacrylic acid in graft polymerization and cross-linking during production of the binder composition for a negative electrode in Example 1 was changed from 8 parts to 10 parts such that the surface acid content of the obtained particulate polymer was changed from 0.4 mmol/g to 0.7 mmol/g. Evaluations were conducted in the same manner as in Example 1. The results are shown in Table 1.

Example 3

A binder composition for a negative electrode, a slurry composition for a negative electrode, a negative electrode, a positive electrode, a separator, and a lithium ion secondary battery were produced in the same way as in Example 1 with the exception that the time for which microfiltration was continued in purification during production of the binder composition for a negative electrode in Example 1 was changed from 30 hours to 20 hours such that the acid content in the aqueous phase of the binder composition per 1 g of the particulate polymer was changed from 0.2 mmol/g to 0.4 mmol/g. Evaluations were conducted in the same manner as in Example 1. The results are shown in Table 1.

Example 4

A binder composition for a negative electrode, a slurry composition for a negative electrode, a negative electrode, a positive electrode, a separator, and a lithium ion secondary battery were produced in the same way as in Example 1 with the exception that the additive amount of methacrylic acid in graft polymerization and cross-linking during production of the binder composition for a negative electrode in Example 1 was changed from 8 parts to 16 parts such that the surface acid content of the obtained particulate polymer was changed from 0.4 mmol/g to 0.8 mmol/g, and the time for which microfiltration was continued in purification during production of the binder composition for a negative electrode in Example 1 was changed from 30 hours to 35 hours such that the acid content in the aqueous phase of the binder composition per 1 g of the particulate polymer was changed from 0.2 mmol/g to 0.4 mmol/g. Evaluations were conducted in the same manner as in Example 1. The results are shown in Table 1.

Example 5

A binder composition for a negative electrode, a slurry composition for a negative electrode, a negative electrode, a positive electrode, a separator, and a lithium ion secondary battery were produced in the same way as in Example 1 with the exception that the additive amount of methacrylic acid in graft polymerization and cross-linking during production of the binder composition for a negative electrode in Example 1 was changed from 8 parts to 4 parts such that the surface acid content of the obtained particulate polymer was changed from 0.4 mmol/g to 0.15 mmol/g, and the time for which microfiltration was continued in purification during production of the binder composition for a negative electrode in Example 1 was changed from 30 hours to 24 hours such that the acid content in the aqueous phase of the binder composition per 1 g of the particulate polymer was changed from 0.2 mmol/g to 0.075 mmol/g. Evaluations were conducted in the same manner as in Example 1. The results are shown in Table 1.

Example 6

A binder composition for a negative electrode, a slurry composition for a negative electrode, a negative electrode, a positive electrode, a separator, and a lithium ion secondary battery were produced in the same way as in Example 1 with the exception that the number of passes in phase-inversion emulsification during production of the binder composition for a negative electrode in Example 1 was changed from 5 passes to 4 passes such that the volume-average particle diameter of the obtained particulate polymer was changed from 0.5 μm to 0.65 μm. Evaluations were conducted in the same manner as in Example 1. The results are shown in Table 1.

Example 7

A binder composition for a negative electrode, a slurry composition for a negative electrode, a negative electrode, a positive electrode, a separator, and a lithium ion secondary battery were produced in the same way as in Example 1 with the exception that in production of a cyclohexane solution of a block polymer during production of the binder composition for a negative electrode in Example 1, the additive amount of styrene as an aromatic vinyl monomer was changed from 30.0 kg to 47.0 kg and the additive amount of 1,3-butadiene as an aliphatic conjugated diene monomer was changed from 70.0 kg to 53.0 kg. Evaluations were conducted in the same manner as in Example 1. The results are shown in Table 1.

Example 8

A binder composition for a negative electrode, a slurry composition for a negative electrode, a negative electrode, a positive electrode, a separator, and a lithium ion secondary battery were produced in the same way as in Example 1 with the exception that in production of a cyclohexane solution of a block polymer during production of the binder composition for a negative electrode in Example 1, the additive amount of styrene as an aromatic vinyl monomer was changed from 30.0 kg to 18.0 kg and the additive amount of 1,3-butadiene as an aliphatic conjugated diene monomer was changed from 70.0 kg to 82.0 kg. Evaluations were conducted in the same manner as in Example 1. The results are shown in Table 1.

Example 9

A binder composition for a negative electrode, a slurry composition for a negative electrode, a negative electrode, a positive electrode, a separator, and a lithium ion secondary battery were produced in the same way as in Example 1 with the exception that 70.0 kg of isoprene was used instead of 70.0 kg of 1,3-butadiene as an aliphatic conjugated diene monomer in production of a cyclohexane solution of a block polymer during production of the binder composition for a negative electrode in Example 1. Evaluations were conducted in the same manner as in Example 1. The results are shown in Table 1.

Example 10

A binder composition for a negative electrode, a slurry composition for a negative electrode, a negative electrode, a positive electrode, a separator, and a lithium ion secondary battery were produced in the same way as in Example 1 with the exception that the number of passes in phase-inversion emulsification during production of the binder composition for a negative electrode in Example 1 was changed from 5 passes to 2 passes such that the volume-average particle diameter of the obtained particulate polymer was changed from 0.5 μm to 1.2 μm. Evaluations were conducted in the same manner as in Example 1. The results are shown in Table 1.

Comparative Example 1

A binder composition for a negative electrode, a slurry composition for a negative electrode, a negative electrode, a positive electrode, a separator, and a lithium ion secondary battery were produced in the same way as in Example 1 with the exception that the time for which microfiltration was continued in purification during production of the binder composition for a negative electrode in Example 1 was changed from 30 hours to 96 hours such that the acid content in the aqueous phase of the binder composition per 1 g of the particulate polymer was changed from 0.2 mmol/g to 0.05 mmol/g. Evaluations were conducted in the same manner as in Example 1. The results are shown in Table 1.

Comparative Example 2

A binder composition for a negative electrode, a slurry composition for a negative electrode, a negative electrode, a positive electrode, a separator, and a lithium ion secondary battery were produced in the same way as in Example 1 with the exception that the time for which microfiltration was continued in purification during production of the binder composition for a negative electrode in Example 1 was changed from 30 hours to 3 hours such that the acid content in the aqueous phase of the binder composition per 1 g of the particulate polymer was changed from 0.2 mmol/g to 1.2 mmol/g. Evaluations were conducted in the same manner as in Example 1. The results are shown in Table 1.

Comparative Example 3

A slurry composition for a negative electrode, a negative electrode, a positive electrode, a separator, and a lithium ion secondary battery were produced in the same way as in Example 1 with the exception that a binder composition for a negative electrode was produced by the following method. Evaluations were conducted in the same manner as in Example 1. The results are shown in Table 1.

<Production of Binder Composition for Negative Electrode>

The water dispersion (block polymer latex) containing a block polymer formed into particles that was obtained by phase-inversion emulsification in production of the binder composition for a negative electrode in Example 1 and an aqueous solution of polymethacrylic acid (produced by Wako Pure Chemical Industries, Ltd.; weight-average molecular weight: 100,000) were loaded into a vessel such that the mass ratio, in terms of solid content, was block polymer:polymethacrylic acid=99:1, and a mixture was obtained. The obtained mixture was stirred by a stirrer (produced by SHINTO Scientific Co., Ltd.; product name: Three-One Motor) for 1 hour to obtain a binder composition for a negative electrode.

Comparative Example 4

A binder composition for a negative electrode, a slurry composition for a negative electrode, a negative electrode, a positive electrode, a separator, and a lithium ion secondary battery were produced in the same way as in Example 1 with the exception that the additive amount of methacrylic acid in graft polymerization and cross-linking during production of the binder composition for a negative electrode in Example 1 was changed from 8 parts to 22 parts such that the surface acid content of the obtained particulate polymer was changed from 0.4 mmol/g to 1.2 mmol/g, and the time for which microfiltration was continued in purification during production of the binder composition for a negative electrode in Example 1 was changed from 30 hours to 3 hours such that the acid content in the aqueous phase of the binder composition per 1 g of the particulate polymer was changed from 0.2 mmol/g to 1.2 mmol/g. Evaluations were conducted in the same manner as in Example 1. The results are shown in Table 1.

In Table 1:

"ST" indicates styrene;

"BD" indicates 1,3-butadiene;

"IP" indicates isoprene; and

"MAA" indicates methacrylic acid.

Moreover, "aromatic vinyl/aliphatic conjugated diene" in Table 1 indicates the mass ratio of aromatic vinyl monomer units and aliphatic conjugated diene monomer units (aromatic vinyl monomer units/aliphatic conjugated diene monomer units) in a polymer forming a particulate polymer.

TABLE 1

|  |  |  |  |  | Example 1 | Example 2 | Example 3 | Example 4 | Example 5 | Example 6 | Example 7 |
|---|---|---|---|---|---|---|---|---|---|---|---|
| Slurry composition for negative electrode | Negative electrode active material |  | Type |  | Graphite | Graphite | Graphite | Graphite | Graphite | Graphite | Graphite |
|  | Binder composition for negative electrode | Particulate Polymer |  | Structure | Block | Block | Block | Block | Block | Block | Block |
|  |  |  | Aromatic vinyl monomer unit | Type | ST | ST | ST | ST | ST | ST | ST |
|  |  |  |  | Proportion [mass %] | 29.0 | 28.2 | 29.0 | 27.9 | 29.6 | 29.0 | 45.4 |
|  |  |  | Aliphatic conjugated diene monomer unit | Type | BD | BD | BD | BD | BD | BD | BD |
|  |  |  |  | Proportion [mass %] | 67.5 | 65.7 | 67.5 | 65.1 | 69.0 | 67.5 | 51.1 |
|  |  |  | Acidic group-containing monomer unit | Type | MAA | MAA | MAA | MAA | MAA | MAA | MAA |
|  |  |  |  | Proportion [mass %] | 3.5 | 6.1 | 3.5 | 7.0 | 1.4 | 3.5 | 3.5 |
|  |  |  | Aromatic vinyl/ aliphatic conjugated diene |  | 30/70 | 30/70 | 30/70 | 30/70 | 30/70 | 30/70 | 47/53 |
|  |  |  | Volume-average particle diameter [μm] |  | 0.5 | 0.5 | 0.5 | 0.5 | 0.5 | 0.65 | 0.5 |
|  |  |  | Surface acid content A of particulate polymer [mmol/g] |  | 0.4 | 0.7 | 0.4 | 0.8 | 0.15 | 0.4 | 0.4 |
|  |  | Water-soluble macromolecules | Type of hydrophilic group |  | Carboxyl group | Carboxyl group | Carboxyl group | Carboxyl group | Carboxyl group | Carboxyl group | Carboxyl group |
|  |  |  | Acid content B in aqueous phase of binder composition [mmol/g] |  | 0.2 | 0.2 | 0.4 | 0.4 | 0.075 | 0.2 | 0.2 |
|  |  |  | A/B |  | 2 | 3.5 | 1 | 2 | 2 | 2 | 2 |
| Evaluations |  | Viscosity stability |  |  | A | B | A | A | B | A | A |
|  |  | Peel strength |  |  | A | B | B | B | B | B | B |
|  |  | Moisture resistance |  |  | A | A | B | B | A | A | A |
|  |  | Internal resistance |  |  | A | B | B | B | A | A | A |

|  |  |  |  |  | Example 8 | Example 9 | Example 10 | Comparative Example 1 | Comparative Example 2 | Comparative Example 3 | Comparative Example 4 |
|---|---|---|---|---|---|---|---|---|---|---|---|
| Slurry composition for negative electrode | Negative electrode active material |  | Type |  | Graphite | Graphite | Graphite | Graphite | Graphite | Graphite | Graphite |
|  | Binder composition for negative electrode | Particulate Polymer |  | Structure | Block | Block | Block | Block | Block | Block | Block |
|  |  |  | Aromatic vinyl monomer unit | Type | ST | ST | ST | ST | ST | ST | ST |
|  |  |  |  | Proportion [mass %] | 17.4 | 29.0 | 29.0 | 28.9 | 28.9 | 30.0 | 26.9 |
|  |  |  | Aliphatic conjugated diene monomer unit | Type | BD | IP | BD | BD | BD | BD | BD |
|  |  |  |  | Proportion [mass %] | 79.1 | 67.5 | 67.5 | 67.5 | 67.5 | 70.0 | 62.7 |
|  |  |  | Acidic group-Containing monomer unit | Type | MAA | MAA | MAA | MAA | MAA | — | MAA |
|  |  |  |  | Proportion [mass %] | 3.5 | 3.5 | 3.5 | 3.5 | 3.5 | — | 10.4 |
|  |  |  | Aromatic vinyl/ aliphatic conjugated diene |  | 18/82 | 30/70 | 30/70 | 30/70 | 30/70 | 30/70 | 30/70 |
|  |  |  | Volume-average particle diameter [μm] |  | 0.5 | 0.5 | 1.2 | 0.5 | 0.5 | 0.5 | 0.5 |
|  |  |  | Surface acid content A of particulate polymer [mmol/g] |  | 0.4 | 0.4 | 0.4 | 0.4 | 0.4 | 0 | 1.2 |
|  |  | Water-soluble macromolecules | Type of hydrophilic group |  | Carboxyl group | Carboxyl group | Carboxyl group | Carboxyl group | Carboxyl group | Carboxyl group | Carboxyl group |
|  |  |  | Acid content B in aqueous phase of binder composition [mmol/g] |  | 0.2 | 0.2 | 0.2 | 0.05 | 1.2 | 0.2 | 1.2 |
|  |  |  | A/B |  | 2 | 2 | 2 | 8 | 0.33 | 0 | 1 |
| Evaluations |  | Viscosity stability |  |  | A | A | A | D | C | C | A |
|  |  | Peel strength |  |  | B | B | C | B | C | D | C |
|  |  | Moisture resistance |  |  | A | B | B | B | D | C | D |
|  |  | Internal resistance |  |  | A | A | C | C | C | C | D |

It can be seen from Table 1 that a slurry composition for a negative electrode having excellent viscosity stability and a negative electrode having excellent moisture resistance are obtained when using the binder compositions for a negative electrode of Examples 1 to 10 that each contain a particulate polymer that is formed of a polymer including a block region formed of an aromatic vinyl monomer unit and that has a surface acid content A of not less than a specific value, water-soluble macromolecules, water, and in each of which the acid content B in the aqueous phase and the ratio (A/B)

of the surface acid content A of the particulate polymer and the acid content B in the aqueous phase are within specific ranges.

On the other hand, it can be seen that although the moisture resistance of a negative electrode is good, the viscosity stability of a slurry composition for a negative electrode is poor when using the binder composition for a negative electrode of Comparative Example 1 in which the surface acid content A of a particulate polymer is not less than a specific value and the acid content B in the aqueous phase is within a specific range but the ratio (A/B) of the surface acid content A of the particulate polymer and the acid content B in the aqueous phase exceeds a specific range.

It can also be seen that the viscosity stability of a slurry composition for a negative electrode and the moisture resistance of a negative electrode are poor when using the binder composition for a negative electrode of Comparative Example 2 in which the surface acid content A of a particulate polymer is not less than a specific value but the acid content B in the aqueous phase exceeds a specific range and the ratio (A/B) of the surface acid content A of the particulate polymer and the acid content B in the aqueous phase falls below a specific range.

It can also be seen that the viscosity stability of a slurry composition for a negative electrode and the moisture resistance of a negative electrode are both poor when using the binder composition for a negative electrode of Comparative Example 3 in which the acid content B in the aqueous phase is within a specific range but the surface acid content A of a particulate polymer is less than a specific value and the ratio (A/B) of the surface acid content A of the particulate polymer and the acid content B in the aqueous phase falls below a specific range.

It can also be seen that although the viscosity stability of a slurry composition for a negative electrode is good, the moisture resistance of a negative electrode is poor when using the binder composition for a negative electrode of Comparative Example 4 in which the surface acid content A of a particulate polymer is not less than a specific value and the ratio (A/B) of the surface acid content A of the particulate polymer and the acid content B in the aqueous phase is within a specific range but the acid content B in the aqueous phase exceeds a specific range.

INDUSTRIAL APPLICABILITY

According to the present disclosure, it is possible to provide a binder composition for a non-aqueous secondary battery with which it is possible to form a slurry composition for a non-aqueous secondary battery electrode having excellent viscosity stability and an electrode for a non-aqueous secondary battery having excellent moisture resistance.

Moreover, according to the present disclosure, it is possible to provide a slurry composition for a non-aqueous secondary battery electrode that has excellent viscosity stability and with which it is possible to form an electrode for a non-aqueous secondary battery having excellent moisture resistance.

Furthermore, according to the present disclosure, it is possible to provide an electrode for a non-aqueous secondary battery that has excellent moisture resistance and a non-aqueous secondary battery that includes this electrode for a non-aqueous secondary battery.

The invention claimed is:

1. A binder composition for a non-aqueous secondary battery comprising: a particulate polymer formed of a polymer that includes a block region formed of an aromatic vinyl monomer unit; water-soluble macromolecules; and water, wherein
   surface acid content A of the particulate polymer per 1 g of the particulate polymer is 0.05 mmol/g or more,
   acid content B in an aqueous phase of the binder composition per 1 g of the particulate polymer is not less than 0.03 mmol/g and not more than 0.80 mmol/g, and
   a ratio A/B of the surface acid content A of the particulate polymer and the acid content B in the aqueous phase of the binder composition is not less than 0.5 and not more than 5.0.

2. The binder composition for a non-aqueous secondary battery according to claim 1, wherein the polymer further includes either or both of an aliphatic conjugated diene monomer unit and an alkylene structural unit.

3. The binder composition for a non-aqueous secondary battery according to claim 2, wherein a mass ratio of aromatic vinyl monomer units and a total of aliphatic conjugated diene monomer units and alkylene structural units in the polymer, in terms of aromatic vinyl monomer units/total of aliphatic conjugated diene monomer units and alkylene structural units, is not less than 15/85 and not more than 50/50.

4. The binder composition for a non-aqueous secondary battery according to claim 2, wherein the aliphatic conjugated diene monomer unit is a 1,3-butadiene unit and the alkylene structural unit is a hydrogenated 1,3-butadiene unit.

5. The binder composition for a non-aqueous secondary battery according to claim 1, wherein the aromatic vinyl monomer unit is a styrene unit.

6. The binder composition for a non-aqueous secondary battery according to claim 1, wherein the polymer includes a graft portion that includes an acidic group-containing monomer unit.

7. The binder composition for a non-aqueous secondary battery according to claim 1, wherein the surface acid content A of the particulate polymer is 1.00 mmol/g or less.

8. The binder composition for a non-aqueous secondary battery according to claim 1, wherein the particulate polymer has a volume-average particle diameter of not less than 0.1 μm and less than 0.9 μm.

9. The binder composition for a non-aqueous secondary battery according to claim 1, wherein the water-soluble macromolecules include an acidic group.

10. A method of producing the binder composition for a non-aqueous secondary battery according to claim 1, comprising a purification step of removing a portion of the water-soluble macromolecules from a mixture that contains the particulate polymer, the water-soluble macromolecules, and water.

11. A slurry composition for a non-aqueous secondary battery electrode comprising: an electrode active material; and the binder composition for a non-aqueous secondary battery according to claim 1.

12. An electrode for a non-aqueous secondary battery comprising an electrode mixed material layer formed using the slurry composition for a non-aqueous secondary battery electrode according to claim 11.

13. A non-aqueous secondary battery comprising the electrode for a non-aqueous secondary battery according to claim 12.

* * * * *